US008599176B2

(12) United States Patent
Teranishi et al.

(10) Patent No.: US 8,599,176 B2
(45) Date of Patent: Dec. 3, 2013

(54) IMAGE DISPLAY DEVICE, ELECTRONIC APPARATUS, PORTABLE APPARATUS, AND IMAGE DISPLAYING METHOD

(75) Inventors: Yasuyuki Teranishi, Kanagawa (JP); Yoshiharu Nakajima, Kanagawa (JP); Yoshitoshi Kida, Kanagawa (JP); Takayuki Nakanishi, Kanagawa (JP)

(73) Assignee: Japan Display West, Inc., Chita (JP)

( * ) Notice: Subject to any disclaimer, the term of this patent is extended or adjusted under 35 U.S.C. 154(b) by 1153 days.

(21) Appl. No.: 12/083,992

(22) PCT Filed: Nov. 2, 2006

(86) PCT No.: PCT/JP2006/322423

§ 371 (c)(1),
(2), (4) Date: Apr. 22, 2008

(87) PCT Pub. No.: WO2007/060842

PCT Pub. Date: May 31, 2007

(65) Prior Publication Data

US 2009/0091579 A1 Apr. 9, 2009

(30) Foreign Application Priority Data

Nov. 28, 2005 (JP) ................................ 2005-341410

(51) Int. Cl.
*G06T 1/60* (2006.01)
*G09G 3/36* (2006.01)
*G09G 5/02* (2006.01)

(52) U.S. Cl.
USPC .............................. 345/204; 345/89; 345/695

(58) Field of Classification Search
USPC .......................................................... 345/204
See application file for complete search history.

(56) References Cited

U.S. PATENT DOCUMENTS

| | | | | |
|---|---|---|---|---|
| 5,945,972 | A * | 8/1999 | Okumura et al. | 345/98 |
| 7,009,590 | B2 * | 3/2006 | Numao | 345/76 |
| 7,075,507 | B2 * | 7/2006 | Ozawa et al. | 345/89 |
| 8,144,102 | B2 * | 3/2012 | Takatoku | 345/98 |
| 2002/0021295 | A1 * | 2/2002 | Koyama et al. | 345/205 |
| 2002/0036611 | A1 * | 3/2002 | Ishii | 345/89 |
| 2002/0036612 | A1 * | 3/2002 | Miyajima et al. | 345/90 |
| 2002/0036625 | A1 * | 3/2002 | Nakamura | 345/204 |
| 2002/0067327 | A1 * | 6/2002 | Ozawa et al. | 345/89 |
| 2002/0089496 | A1 * | 7/2002 | Numao | 345/204 |
| 2003/0011314 | A1 * | 1/2003 | Numao | 315/169.3 |
| 2003/0058195 | A1 * | 3/2003 | Adachi et al. | 345/67 |
| 2003/0142056 | A1 * | 7/2003 | Okamoto | 345/90 |
| 2004/0156246 | A1 * | 8/2004 | Nakamura | 365/199 |
| 2005/0168570 | A1 * | 8/2005 | Kim et al. | 348/71 |

FOREIGN PATENT DOCUMENTS

| | | |
|---|---|---|
| EP | 1 111 577 A2 | 6/2001 |
| EP | 1187087 | 3/2002 |
| EP | 1 193 674 A2 | 4/2002 |
| JP | 60-064395 | 4/1985 |
| JP | 09-212140 | 8/1997 |

(Continued)

*Primary Examiner* — Amare Mengistu
*Assistant Examiner* — Sarvesh J Nadkarni
(74) *Attorney, Agent, or Firm* — Robert J. Depke

(57) ABSTRACT

The present invention is applied to e.g. a liquid crystal display apparatus based on a multi-bit memory system. In the invention, input image data (SIG) is recorded in a memory part 62 in each pixel, and the grayscale is represented by time-division driving in accordance with the input image data (SIG) recorded in this memory part 62.

16 Claims, 41 Drawing Sheets

(56) References Cited

FOREIGN PATENT DOCUMENTS

| | | |
|---|---|---|
| JP | 11-02797 | 1/1999 |
| JP | 2002-91395 | 3/2002 |
| JP | 2002-132217 | 5/2002 |
| JP | 2002-156953 | 5/2002 |
| JP | 2002-169503 | 6/2002 |
| JP | 2002-175039 | 6/2002 |
| JP | 2002-268600 | 9/2002 |
| JP | 2002-278498 | 9/2002 |
| JP | 2002-287718 | 10/2002 |
| JP | 2003-131628 | 9/2003 |
| JP | 2004-086154 | 3/2004 |
| JP | 2005-164814 | 6/2005 |
| JP | 2005-523468 | 8/2005 |

* cited by examiner

SERI0

SERI1

SERI2

SERI3

SERI4

SERI5

SIG
Lout0
Lout1
Lout2
Lout3
Lout4
Lout5

VSRout

ENB0

ENB1

ENB2

ENB3

ENB4

ENB5

GATE0

GATE1

GATE2

GATE3

GATE4

GATE5

FIG.42

DESCRIPTION OF NUMERALS 1, 51, 181, 191, 201 ······ IMAGE DISPLAY
2, 52, 142, 182, 202 ······ DISPLAY UNIT
2A, 52A, 82A, 92A, 102A, 202A ······ PIXEL
2AA to 2AF ······ SUB-PIXEL, 3A to 3F, 53, 83 ······ ELECTRODE
4A to 4F, 54, 54A, 54B, 54C ······ PIXEL CIRCUIT
5A to 5F, 55 ······ LIQUID CRYSTAL CELL
6, 7, 60, 61, 110, 120 ······ INVERTER
8, 9, 10, 56, 57, 58, 64, 65, 66, 203, 204, 213A, 213B, 214A, 214B ······ SWITCH CIRCUIT
11, 185 ······ INTERFACE
12O, 12E, 206O, 206E ······ HORIZONTAL DRIVER
14, 71, 183, 205 ······ TIMING GENERATOR
15, 186, 207 ······ VERTICAL DRIVER
21A, 21B, 41A, 41B ······ SHIFT REGISTER
22A, 22B ······ SAMPLING LATCH, 23A, 23B ······ SECOND LATCH
24A, 24B, 210A, 210B ······ PARALLEL-SERIAL CONVERSION CIRCUIT
25 to 30, 42A0 to 42A5, 211A to 211C ······ AND CIRCUIT
31 ······ OR CIRCUIT
32, 43A0 to 43A5, 212A to 212C ······ BUFFER CIRCUIT
58A to 58F, 58AA, 58AB, 58BA, 58BB, 118A, 118B, 128A, 128B ······ DRIVE CIRCUIT
62 ······ MEMORY, 93A, 93B, 93C, 103A, 103B, 103C ······ SUB-ELECTRODE
131 ······ EXCLUSIVE-OR CIRCUIT, 184, 194, 208 ······ CONTROLLER
186A, 186B ······ DRIVE CIRCUIT GROUP
196 ······ PARALLAX GENERATING MECHANISM
211A, 211B ······ DIGITAL-ANALOG CONVERSION CIRCUIT
Q1 to Q9, Q51 to Q59, Q61, Q65, Q200, Q201 ······ TRANSISTOR

IMAGE DISPLAY DEVICE, ELECTRONIC APPARATUS, PORTABLE APPARATUS, AND IMAGE DISPLAYING METHOD

This application is a 371 U.S. National Stage filing of PCT/JP2006/322423, filed Nov. 2, 2006, which claims priority to Japanese Patent Application Number JP2005-341410 filed Nov. 28, 2005, all of which are incorporated herein by reference.

BACKGROUND OF THE INVENTION

1. Technical Field

The present invention relates to an image display device, electronic apparatus, portable apparatus, and an image displaying method, and can be applied to e.g. a liquid crystal display based on a multi-bit memory system. According to the present invention, input image data is recorded in a memory part of each pixel, and the grayscale is represented by time-division driving in accordance with the input image data recorded in the memory part. By this feature, in image displaying by a multi-bit memory system, images are displayed with higher efficiency and higher image quality compared with conventional techniques.

2. Background Art

Conventionally, for a liquid crystal display, there has been proposed a so-called area-ratio grayscale system in Japanese Patent Laid-Open No. 2005-1641814 and so on. In this system, one pixel is composed of plural sub-pixels having different areas, and the grayscale of each pixel is varied by changing the area of the region used for displaying through control of the displaying/non-displaying of these plural sub-pixels. Furthermore, this Japanese Patent Laid-Open No. 2005-1641814 proposes a method of providing each one sub-pixel with a one-bit memory and controlling the displaying/non-displaying of the corresponding sub-pixel through recording in this memory to thereby represent the grayscale of input image data composed of multiple bits. Hereinafter, such a system, in which each one pixel is provided with a multi-bit memory and the grayscale of each pixel is represented through recording in this multi-bit memory, will be referred to as a multi-bit memory system.

FIG. 1 is a block diagram showing an image display device of this multi-bit memory system based on the area-ratio grayscale system. In this image display device 1, a display unit 2 is a reflective liquid crystal display panel or a transmissive liquid crystal display panel, and is formed by arranging pixels provided with a color filter of red, green, and blue in a matrix.

FIG. 2 shows the configuration of one pixel 2A in this display unit 2. As shown in FIG. 2, each pixel 2A is composed of plural sub-pixels 2AA to 2AF in which the ratio of the areas of electrodes 3A, 3B, 3C, 3D, 3E, and 3F, which are portions used for displaying, is set to 1:2:4:8:16:32. The respective sub-pixels 2AA to 2AF are formed to have the same configuration, except that the areas of the electrodes 3A to 3F are so designed as to have a certain proportional relationship. In these sub-pixels, liquid crystal cells 5A to 5F including the electrodes 3A to 3F are driven by pixel circuits 4A to 4F, respectively, shown in FIG. 3.

Specifically, the pixel circuits 4A to 4F include a CMOS inverter 6 and a CMOS inverter 7. The CMOS inverter 6 is composed of an N-channel MOS (hereinafter, referred to as NMOS) transistor Q1 and a P-channel MOS (hereinafter, referred to as PMOS) transistor Q2 whose gates and drains are connected to each other. The CMOS inverter 7 is composed of an NMOS transistor Q3 and a PMOS transistor Q4 whose gates and drains are connected to each other similarly. These CMOS inverters 6 and 7 are provided in parallel to each other between a positive power supply line VDD and a negative power supply line VSS, and are connected to each other in a loop manner, so that a memory based on an SRAM (Static Random Access Memory) configuration is formed. In the pixel circuits 4A to 4F, an NMOS transistor Q5 serves as a switch circuit 8 that connects a signal line SIG to these CMOS inverters 6 and 7 and supplies the memory with the logical value of the signal line SIG. Based on this configuration, as shown in FIG. 4, the data through the signal line SIG (FIG. 4(A)) is set in the memory (FIG. 4(C)) through control of the NMOS transistor Q5 by a gate signal GATE (FIG. 4(B)). Symbol V1 denotes the input-side potential of the inverter 6, which is on the input side with respect to this switch circuit 8.

In the pixel circuits 4A to 4F, in accordance with the data thus held in the memory, one of a drive signal FRP (FIG. 4(D)) and a drive signal XFRP (FIG. 4(E)) that are in phase and in antiphase, respectively, with a common voltage VCOM (FIG. 4(G)) applied to the common electrode of the liquid crystal cell 5A (5B to 5F) is selected and applied to the liquid crystal cell 5A (5B to 5F), to thereby drive the liquid crystal cell 5A (5B to 5F). That is, the pixel circuits 4A to 4F control the ON/OFF of a switch circuit 9 composed of an NMOS transistor Q6 and a PMOS transistor Q7 by the output of the inverter 7, to thereby apply the drive signal XFRP, which is in phase with the common potential VCOM, to the liquid crystal cell 5A (5B to 5F) via this switch circuit 9. Furthermore, the pixel circuits 4A to 4F control the ON/OFF of a switch circuit 10 composed of similar NMOS transistor Q8 and PMOS transistor Q9 by the output of the inverter 6, to thereby apply the drive signal FRP, which is in antiphase with the common potential VCOM, to the liquid crystal cell 5A (5B to 5F) via this switch circuit 10. Due to these operations, as shown in FIG. 4, if the potential of the signal line SIG is switched, voltage V5 (FIG. 4(F)) applied to the liquid crystal cell 5A (5B to 5F) is switched from voltage in phase with the common potential VCOM to voltage in antiphase with it at timing t1 of the rising-up of the gate signal GATE subsequent to the switching of the potential of the signal line SIG. This allows the state of the liquid crystal cell 5A (5B to 5F) to be switched between the displaying state and the non-displaying state. The example shown in FIG. 4 corresponds to the case of a so-called normally black mode.

In the image display device 1 (FIG. 1), an interface (IF) 11 inputs, from the configuration of the apparatus provided with this image display device 1, image data SDI as serial data sequentially indicating the grayscales of the respective pixels, a system clock SCK in synchronization with this image data SDI, and a timing signal SCS in synchronization with a vertical synchronizing signal. The interface 11 separates this image data SDI into two-channel data corresponding to odd-numbered lines and even-numbered lines of the display unit 2, and outputs the separated image data DATA to horizontal drivers 12O and 12E. Furthermore, the interface 11 produces a clock LSSCK in synchronization with this image data DATA and outputs it to a timing generator 14. In addition, based on the timing signal SCS, the interface 11 outputs to the timing generator 14 a reset signal RST whose signal level rises up at the timing in synchronization with the vertical synchronizing signal.

The timing generator 14 produces various kinds of timing signals necessary for the operation of the horizontal drivers 12O and 12E and a vertical driver 15 from the clock LSSCK and the reset signal RST, and outputs the produced signals.

The horizontal drivers 12O and 12E operate in accordance with the timing signals output from the timing generator 14, and set the logical level of the signal line SIG in matching with the image data DATA output from the interface 11, for the pixels on the odd-numbered lines and even-numbered lines of the display unit 2.

Specifically, as shown in FIG. 5, in the horizontal drivers 12O and 12E, a timing signal HST that rises up at the timing of the start of a horizontal scanning period is transferred by shift registers (SR) 21A, 21B, . . . sequentially in the line direction, and the image data DATA is latched by sampling latches (SL) 22A, 22B, . . . in accordance with the timing signal output from the respective shift registers 21A, 21B, . . . . This allows the horizontal drivers 12O and 12E to distribute the image data DATA toward the corresponding signal line SIG.

Second latches 23A, 23B, . . . latch and output the latch results by the sampling latches 22A, 22B, . . . . This can output the image data distributed toward the respective signal lines SIG at the same timing. Parallel-serial conversion circuits (PS) 24A, 24B, . . . sequentially select and output the logical values of the respective bits in latch results Lout by the second latches 23A, 23B, . . . in accordance with selection signals SERI, to thereby convert the input image data distributed toward the respective signal lines SIG into serial data and output it.

Specifically, as shown in FIGS. 6 and 7, in the parallel-serial conversion circuits 24A, 24B, . . . , AND circuits 25 to 30 gate logical values Lout0 to Lout5 of the respective bits in the latch result Lout based on the selection signals SERI0 to SERI5 (FIGS. 7(A0) to 7(A5)) whose signal levels rise up sequentially and cyclically. An OR circuit 31 produces the OR signal of the output signals from these AND circuits 25 to 30. The parallel-serial conversion circuits 24A, 24B, . . . output the output signal from this OR circuit 31 via a buffer circuit 32, to thereby output the image data distributed toward the respective signal lines SIG to the signal line SIG as one-bit serial data (FIG. 7(B)).

In matching with the driving of the signal lines SIG by these horizontal drivers 12O and 12E, the vertical driver 15 (FIG. 1) selects the pixels 2A in the display unit 2 on a line-by-line basis in accordance with the timing signal produced by the timing generator 14. Furthermore, for each line, the vertical driver 15 outputs the gate signals GATE0 to GATE5 for sequentially selecting the sub-pixels.

Specifically, as shown in FIG. 8, in the vertical driver 15, a timing signal VST (FIG. 7(C)) whose signal level rises up in synchronization with the vertical synchronizing signal is transferred by shift registers (SR) 41A, 41B, . . . in the vertical direction. In the vertical driver 15, AND circuits 42A0 to 42A5, 42B0 to 42B5, . . . gate selection signals ENB0 to ENB5 (FIGS. 7(D0) to 7(D5)) whose signal levels rise up sequentially and cyclically based on the output signal from the shift registers 41A, 41B, . . . , to thereby produce the gate signals GATE0 to GATE5 (FIGS. 7(E0) to 7(E5)) for sequentially selecting each of the sub-pixels on the respective lines. The vertical driver 15 outputs the gate signals GATE0 to GATE5 to the display unit 2 via buffer circuits 43A0 to 43A5, 43B0 to 43B5, . . . .

Based on the above-described configuration, in the image display device 1 of the example shown in FIG. 1, one signal line is allocated to plural pixels arranged along the vertical direction based on time division, and one signal line SIG is allocated to the sub-pixels in one pixel based on time division. A desired image is displayed through control of the displaying/non-displaying of the respective sub-pixels. The image display device based on such a multi-bit memory system can be widely applied even to the case in which a liquid crystal cell employing both a reflective electrode and a transmissive electrode instead of a reflective liquid crystal or transmissive liquid crystal is used.

However, this multi-bit memory system involves the need to insulate the electrodes of the plural sub-pixels in one pixel from each other. This yields the useless region that does not contribute to displaying in one pixel, which results in a drawback of the lowering of the transmittance and reflectivity of one pixel. This causes a problem of failure in image displaying with high efficiency.

Furthermore, because the grayscale is represented through control of the ON/OFF of the sub-pixels having different areas, the position of the centroid of the region relating to displaying varies from pixel to pixel depending on the luminance of the pixel. This yields a drawback that a fixed pattern dependent upon the arrangement of the sub-pixels is visually recognized at specific grayscales. In addition, there is a drawback that the resolution and the number of grayscales are limited by the processing accuracy of the sub-pixel having the smallest area. Moreover, there is also a drawback that a large number of semiconductor elements need to be provided in one pixel and thus the resolution and the number of grayscales are limited. For these reasons, the above-described system involves a problem that the image quality is insufficient in practical use.

DISCLOSURE OF THE INVENTION

The present invention is made in consideration of the above-described respects, and is to provide, for a multi-bit memory system, an image display, electronic apparatus, portable apparatus, and an image displaying method that can solve all of these drawbacks and allow image displaying with higher efficiency and higher image quality compared with conventional techniques.

In order to solve the problem, the present invention is applied to an image display device including a display unit that has pixels arranged in a matrix, a vertical driver that outputs a gate signal to the display unit, a horizontal driver that distributes and outputs input image data to signal lines of the display unit, and a timing generator that outputs a timing signal for reference of operation to the display unit, the horizontal driver, and the vertical driver. The input image data is multi-bit image data. The pixel includes a memory part that is supplied with and holds the input image data output to the signal line selectively in accordance with the gate signal. The pixel represents a grayscale based on time-division driving in accordance with the input image data held in the memory part.

According to the configuration of the present invention, in application to an image display device including a display unit that has pixels arranged in a matrix, a vertical driver that outputs a gate signal to the display unit, a horizontal driver that distributes and outputs input image data to signal lines of the display unit, and a timing generator that outputs a timing signal for reference of operation to the display unit, the horizontal driver, and the vertical driver, the input image data is multi-bit image data, and the pixel includes a memory part that is supplied with and holds the input image data output to the signal line selectively in accordance with the gate signal, and represents a grayscale based on time-division driving in accordance with the input image data held in the memory part. Due to this configuration, for image displaying based on a multi-bit memory system, the pixel can be fabricated with an electrode having an area larger than that of an electrode used in the area-ratio grayscale method. This can reduce a useless region among the electrodes and can prevent the occurrence of a fixed pattern. Furthermore, the limitation on the resolution and the number of grayscales due to the processing accuracy of the electrode is alleviated, and the number of semiconductor elements can be reduced. Due to these advantages, by a multi-bit memory system, image displaying can be performed with higher efficiency and higher image quality compared with conventional techniques.

Furthermore, the present invention is applied to electronic apparatus that acquires input image data by image acquiring means and displays the input image data by an image display device part. The image display device part includes a display unit that has pixels arranged in a matrix, a vertical driver that outputs a gate signal to the display unit, a horizontal driver that distributes and outputs the input image data to signal lines of the display unit, and a timing generator that outputs a timing signal for reference of operation to the display unit, the horizontal driver, and the vertical driver. The input image data is multi-bit image data. The pixel includes a memory part that is supplied with and holds the input image data output to the signal line selectively in accordance with the gate signal. The pixel represents a grayscale based on time-division driving in accordance with the input image data held in the memory part.

According to the configuration of the present invention, by a multi-bit memory system, image displaying can be performed with higher efficiency and higher image quality compared with conventional techniques.

In addition, the present invention is applied to portable apparatus that operates based on a battery and acquires input image data by image acquiring means to display the input image data by an image display device part. The image display device part includes a display unit that has pixels arranged in a matrix, a vertical driver that outputs a gate signal to the display unit, a horizontal driver that distributes and outputs the input image data to signal lines of the display unit, and a timing generator that outputs a timing signal for reference of operation to the display unit, the horizontal driver, and the vertical driver. The input image data is multi-bit image data. The pixel includes a memory part that is supplied with and holds the input image data output to the signal line selectively in accordance with the gate signal. The pixel represents a grayscale based on time-division driving in accordance with the input image data held in the memory part.

According to the configuration of the present invention, by a multi-bit memory system, image displaying can be performed with higher efficiency and higher image quality compared with conventional techniques.

Moreover, the present invention is applied to an image displaying method for driving pixels arranged in a matrix based on corresponding input image data to thereby display an image corresponding to the input image data. The method includes an image-data recording step of recording the corresponding input image data in a memory part for multiple bits provided in one pixel, and a displaying step of carrying out driving for a time period corresponding to a respective one of bits of the memory part to thereby represent a grayscale based on time-division driving in accordance with the input image data.

According to the configuration of the present invention, by a multi-bit memory system, image displaying can be performed with higher efficiency and higher image quality compared with conventional techniques.

The present invention can provide, for image displaying based on a multi-bit memory system, electronic apparatus, portable apparatus, and an image displaying method that can solve all of drawbacks in conventional techniques and allow image displaying with higher efficiency and higher image quality compared with conventional techniques.

BRIEF DESCRIPTION OF THE DRAWINGS

FIG. 42 provides a correlation between reference numerals used throughout the specification and drawings with a verbal description of the related structures.

BEST MODES FOR CARRYING OUT THE INVENTION

Embodiments of the present invention will be described in detail below with reference to the accompanying drawings.

(1) Configuration of First Embodiment

Figure 1:
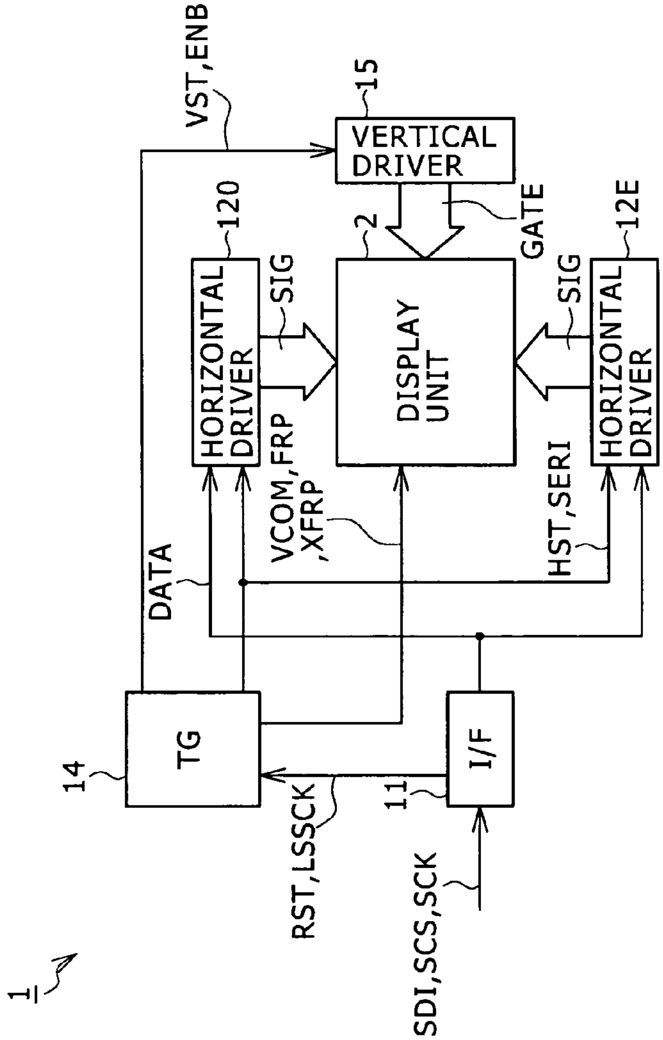
FIG. 1 is a block diagram showing a conventional image display.
Figure 9:
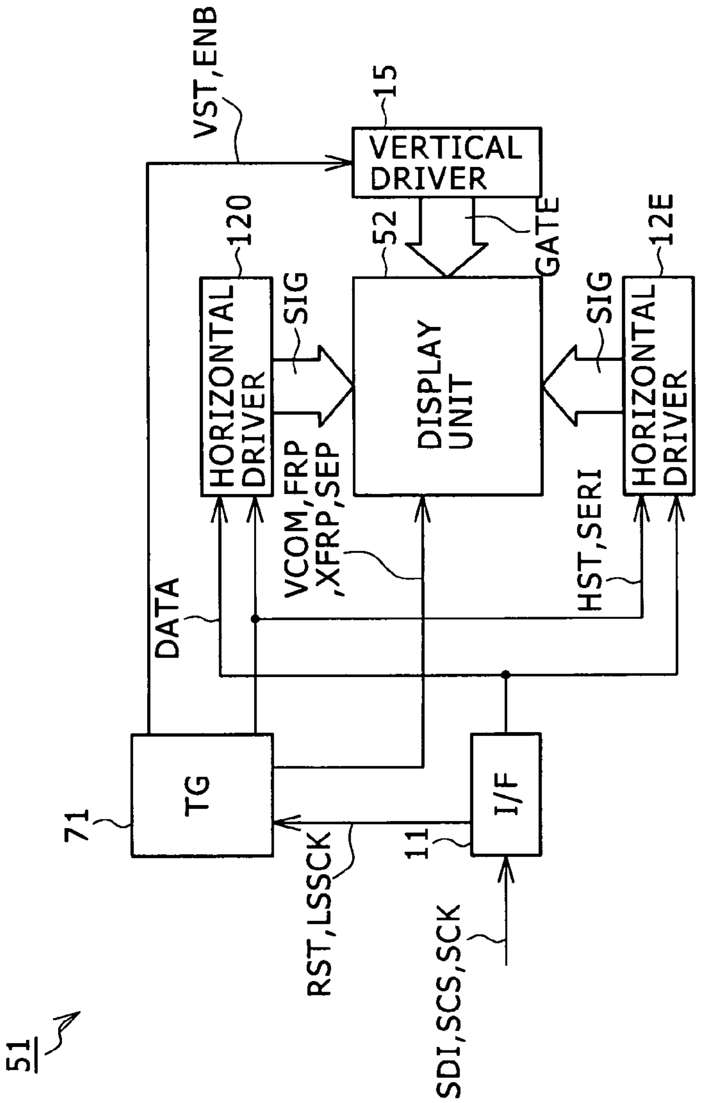
FIG. 9 is a block diagram showing an image display device according to a first embodiment of the present invention.

FIG. 9 is a block diagram showing an image display device according to a first embodiment of the present invention. This image display device 51 displays an image based on video data output from e.g. a tuner unit or external apparatus not shown on a display unit 52 by a multi-bit memory system. For the image display device 51 shown in FIG. 9, the same components as those in the image display device 1 described above with FIG. 1 are given the same symbols, and overlapping description thereof is omitted.

Figure 10:
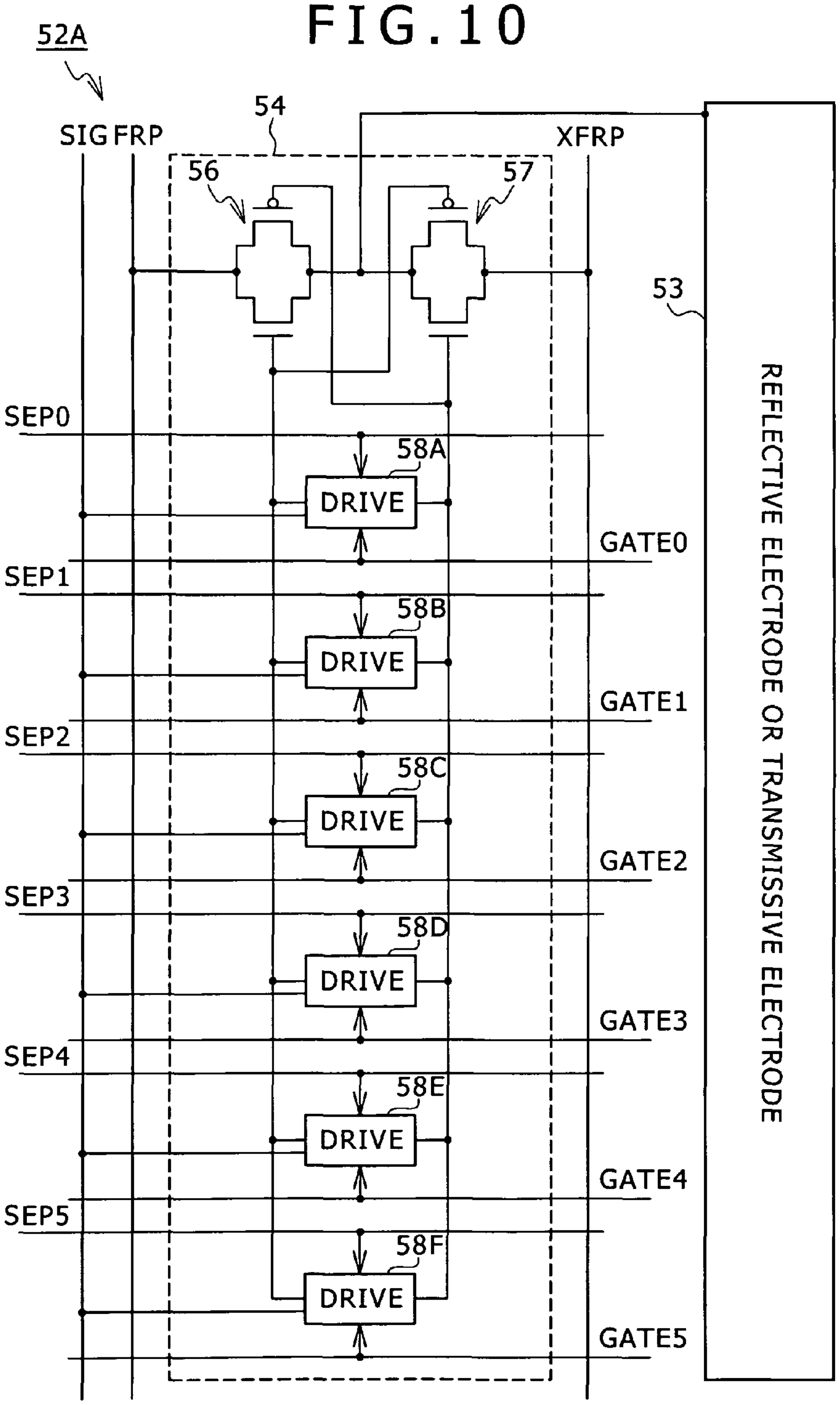
FIG. 10 is a connection diagram showing one pixel applied to the image display device of FIG. 9.

The display unit 52 is a reflective liquid crystal display panel or a transmissive liquid crystal display panel, and is formed by arranging pixels provided with a color filter of red, green, and blue in a matrix. FIG. 10 shows the configuration of one pixel 52A in this display unit 52. As shown in FIG. 10, in the pixel 52A, one electrode 53 having a large area is disposed at the part used for displaying, and a liquid crystal cell is formed by using this electrode 53. Each pixel 52A is provided with a pixel circuit 54, and the grayscale is represented through driving of the electrode 53 by this drive circuit 54.

Figure 11:
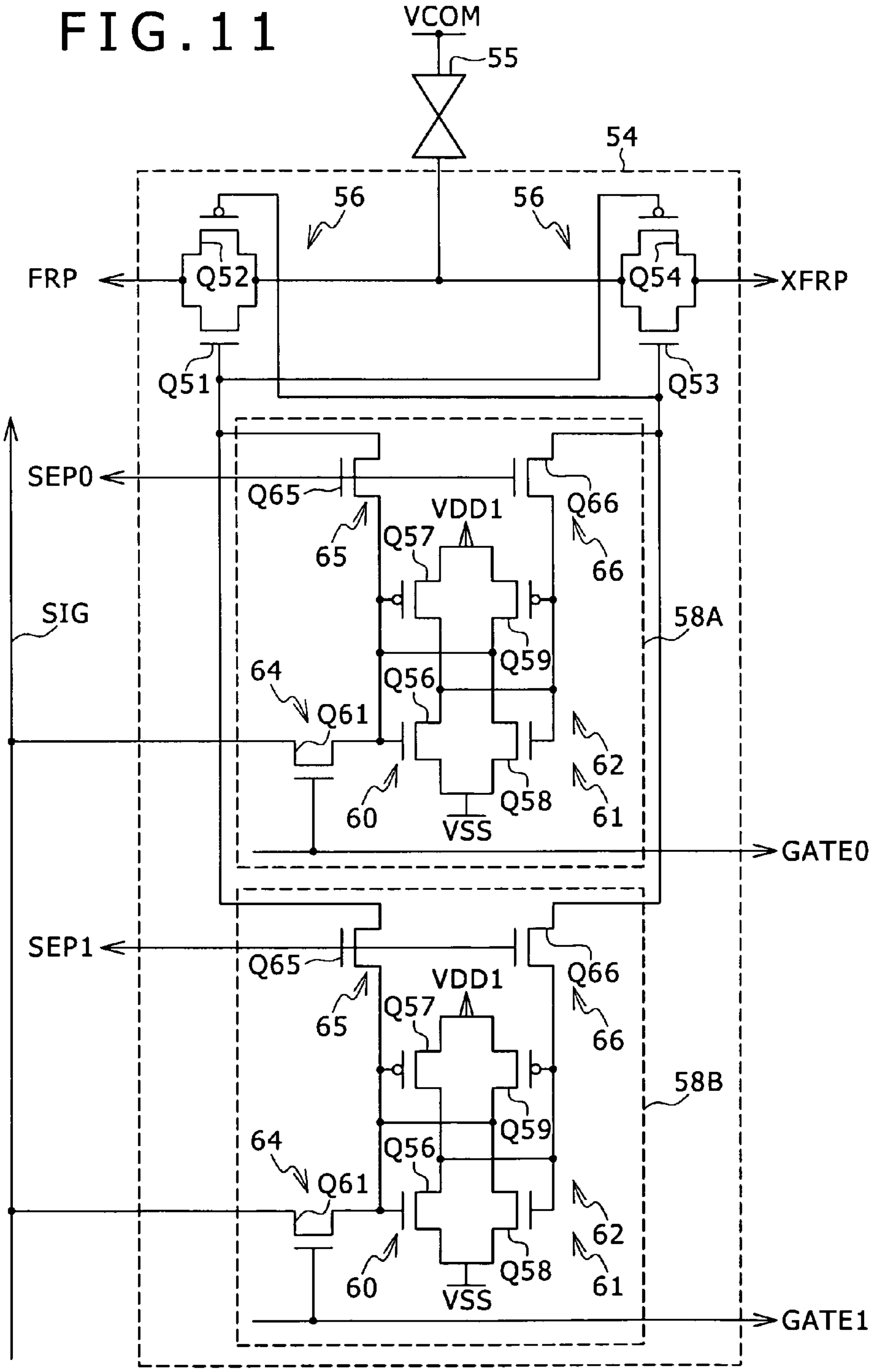
FIG. 11 is a connection diagram showing the basic configuration of one pixel of FIG. 10.
Figures 12, 12A, 12B, 12C, 12E:
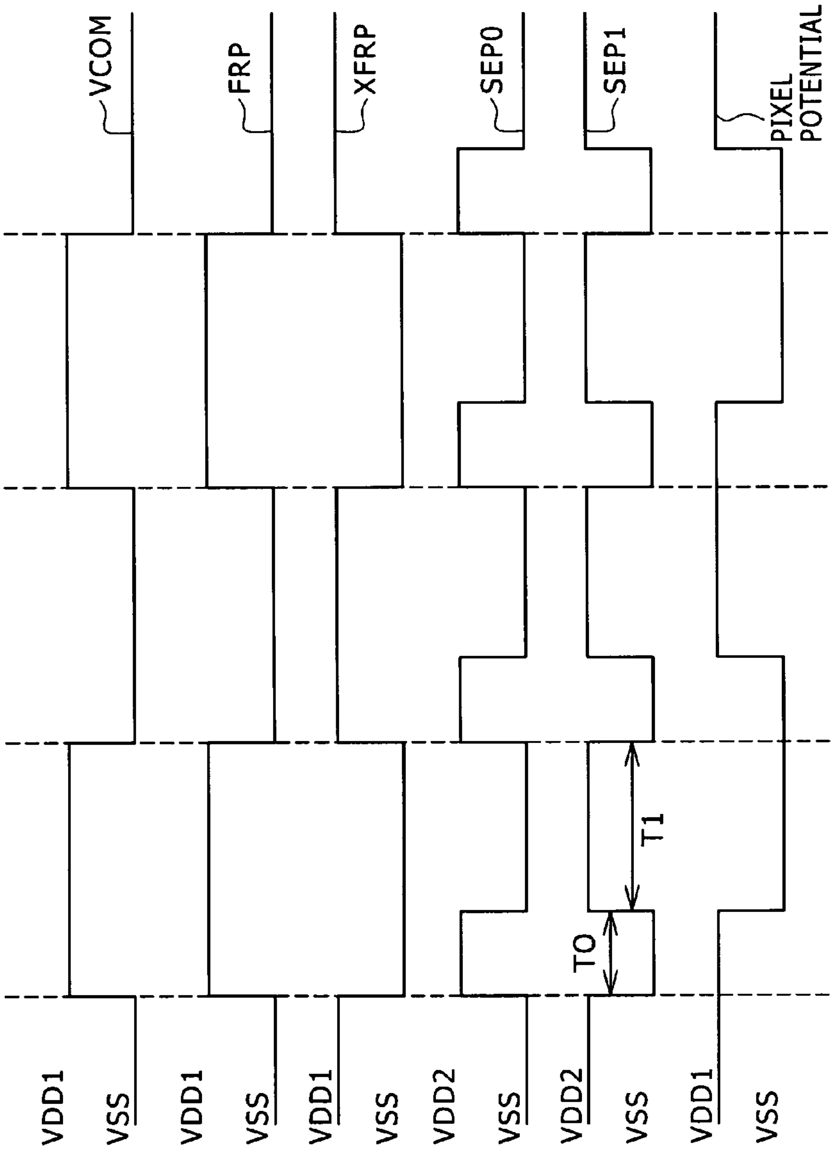
FIG. 12 is a time chart for explaining the operation of the pixel of FIG. 11.

FIG. 11 shows an example of the configuration of the pixel circuit 54 corresponding to the case of representing the grayscale by two bits. As shown in FIG. 12, in each pixel 52A, a common voltage VCOM (FIG. 12(A)) whose signal level is switched with e.g. the frame cycle is applied to the common electrode of a liquid crystal cell 55. In the pixel circuit 54, the electrode 53 is connected to a drive signal FRP (FIG. 12(B)) that is in phase with this common voltage VCOM via a switch circuit 56 composed of an NMOS transistor Q51 and a PMOS transistor Q52 whose sources and drains are connected to each other. Furthermore, the electrode 53 is connected to a drive signal XFRP (FIG. 12(C)) that is in antiphase with the common voltage VCOM via a switch circuit 57 composed of an NMOS transistor Q53 and a PMOS transistor Q54 whose sources and drains are connected to each other similarly.

Based on this configuration, the pixel circuit 54 controls the ON/OFF of the switch circuits 56 and 57 in a complementary manner to thereby switch the displaying/non-displaying of the liquid crystal cell 55. Furthermore, the pixel circuit 54 controls the ON/OFF of the switch circuits 56 and 57 based on time division by using drive circuits 58A and 58B that each function for displaying corresponding to a respective one of the bits of image data. The grayscale is represented based on the time-division driving by these drive circuits 58A and 58B. More specifically, the times of the driving of the switch circuits 56 and 57 by these drive circuits 58A and 58B are so designed as to correspond to the image-data bits handled by the pixel circuits 58A and 58B. This allows the liquid crystal cell 55 with one electrode 53 to be driven based on time division.

The drive circuits 58A and 58B are formed to have the same configuration, except that the handling-target bit and the signal relating to the control are different. Thus, in the following, only the configuration of the drive circuit 58A will be described and overlapping description is omitted. The drive circuit 58A includes a CMOS inverter 60 and a CMOS inverter 61. The CMOS inverter 60 is composed of an NMOS transistor Q56 and a PMOS transistor Q57 whose gates and drains are connected to each other. The CMOS inverter 61 is composed of an NMOS transistor Q58 and a PMOS transistor Q59 whose gates and drains are connected to each other similarly. These CMOS inverters 60 and 61 are provided in parallel to each other between a positive power supply line VDD1 and a negative power supply line VSS, and are connected to each other in a loop manner, so that a memory 62 based on an SRAM configuration is formed.

Furthermore, the drive circuit 58A includes a switch circuit 64 formed of an NMOS transistor Q61 that is switched ON/OFF by a gate signal GATE and writes the logical value of a signal line SIG to the memory 62. In addition, the drive circuit 58A includes switch circuits 65 and 66 formed of NMOS transistors Q65 and Q66 that selectively supply the output of the memory 62 to the switch circuits 56 and 57 in accordance with a selection signal SEP. Consequently, this pixel circuit 54 can be represented by an equalizing circuit shown in FIG. 13.

Figure 2:
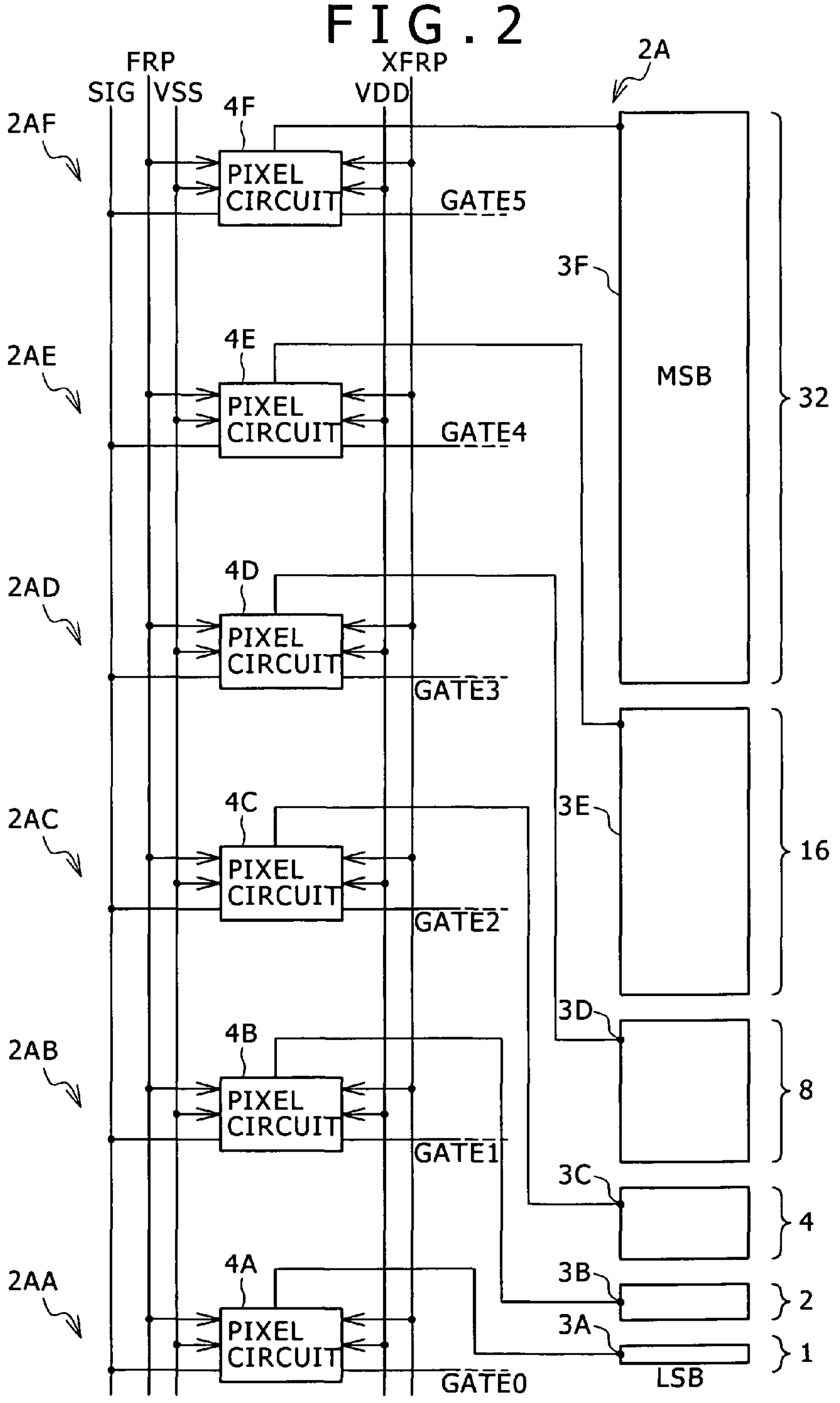
FIG. 2 is a connection diagram showing the configuration of a pixel in the image display device of FIG. 1.

For each pixel circuit 54, as shown in FIGS. 12(D1) and (D2), the ratio of periods T0 and T1, during which the signal level of the selection signals SEP0 and SEP1, respectively, supplied to the drive circuits 58A and 58B is kept at the high level to thereby entrust the drive circuits 58A and 58B, respectively, with control of the switch circuits 56 and 57, is set to the ratio corresponding to the respective bits of the input image data. Thus, in the example of FIG. 11, the ratio of the periods T0 and T1 is set to 1:2. The logical value from the signal line SIG is input as serial data to the respective drive circuits 58A and 58B similarly to the above description of the pixel circuits 4A to 4F with use of FIG. 2. Furthermore, in accordance with the selection signals SEP0 and SEP1, the logical value of the lower bit of the image data is selectively input to the drive circuit 58A, which is entrusted with the control of the switch circuits 56 and 57 for the shorter period, and the logical value of the upper bit is selectively input to the other drive circuit 58B.

Based on this configuration, the pixel circuit 54 records and holds the input image data in the memory part formed of the memories 62 in the drive circuits 58A and 58B. By time-division driving in accordance with the input image data held in this memory part, the pixel circuit 54 represents the grayscale of the input image data based on two bits by using the effect of an integral along the time axis direction (FIG. 12(E)).

Based on such a grayscale representation principle, the pixel 52A in the image display device 51 (FIG. 10) is provided with six drive circuits 58A to 58F so that the grayscale based on six bits can be represented. The times of control of the switch circuits 56 and 57 by these six drive circuits 58A to 58F are so designed by the selection signals SEP0 to SEP5 as to each correspond to the bit for which driving is handled by a corresponding one of the drive circuits 58A to 58F.

Figures 14, 14A, 14B, 14C, 14E:
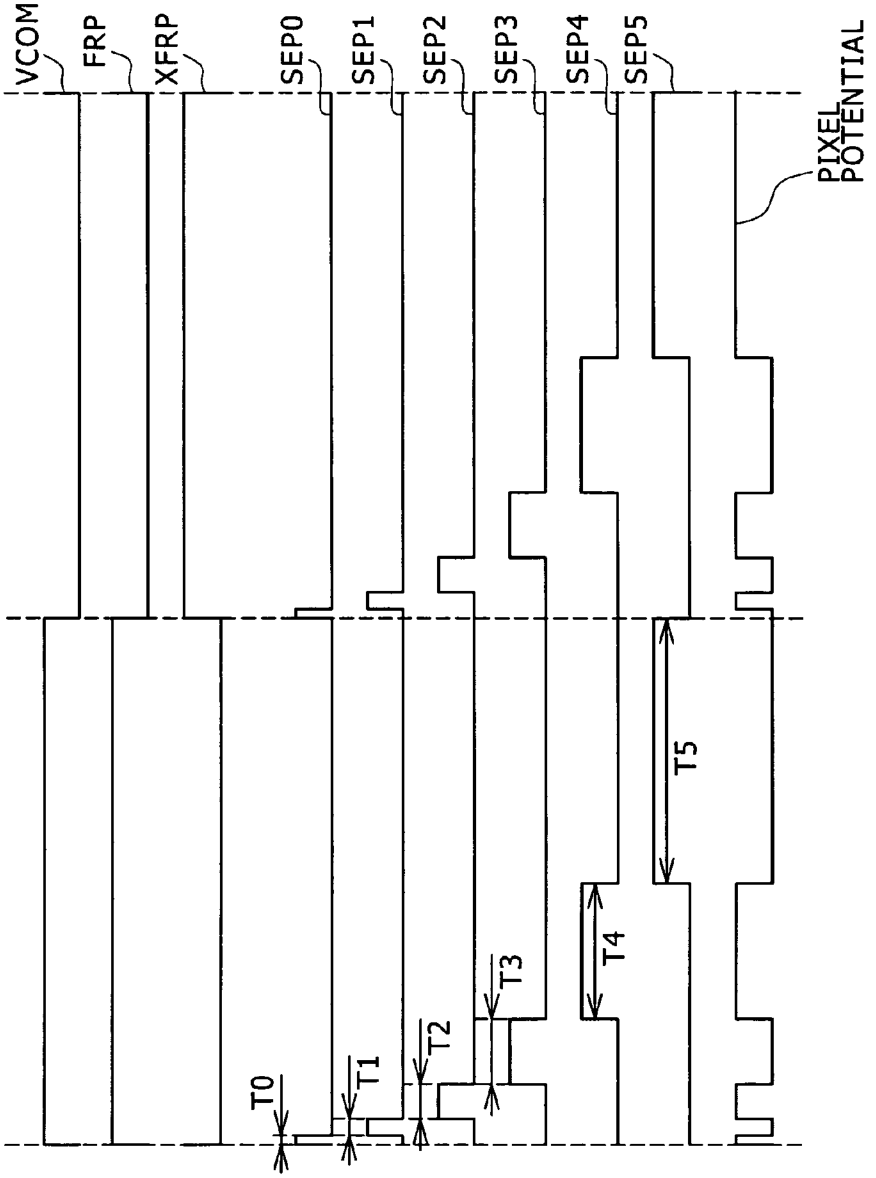
FIG. 14 is a time chart for explaining the operation of the pixel of FIG. 12.

Specifically, in the image display device 51 (FIG. 9), a timing generator 71 produces and outputs the common voltage VCOM and the drive signals FRP and XFRP as shown in FIG. 14 (FIGS. 14(A) to (C)). Furthermore, the timing generator 71 produces the selection signals SEP0 to SEP5 (FIGS. 14(D1) to (D6)) for entrusting a respective one of the drive circuits 58A to 58F with the control of the switch circuits 56 and 57. The selection signals SEP0 to SEP5 are so designed that the signal level thereof is selectively raised up sequentially in the one-frame period and that the lengths of the periods T0 to T5 increase by a power of two in the increasing order along the direction from the least significant bit to the most significant bit. Thus, in this example, with respect to the period T0, during which the signal level of the selection signal SEP0 relating to the least significant bit is kept at the high level, the periods T1 to T5, during which the signal level of the selection signals SEP1 to SEP5, respectively, relating to the upper bits is kept at the high level, are designed to have the lengths of two times, four times, eight times, sixteen times, and thirty-two times, respectively (FIG. 14(E)). In this image display device 51, the timing generator 71, horizontal drivers 12O and 12E, and so on are integrally formed on the glass substrate of the display unit 52.

(2) Operation of First Embodiment

Figure 5:
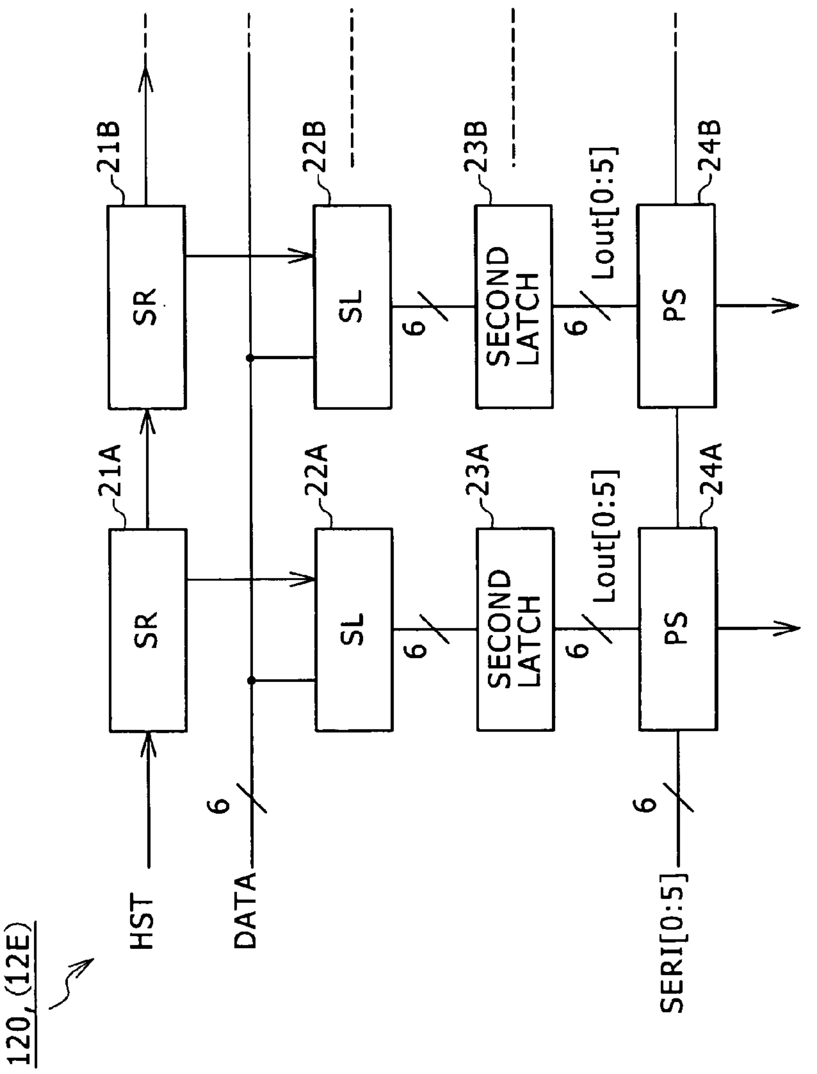
FIG. 5 is a block diagram showing a horizontal driver in the image display device of FIG. 1.
Figure 6:
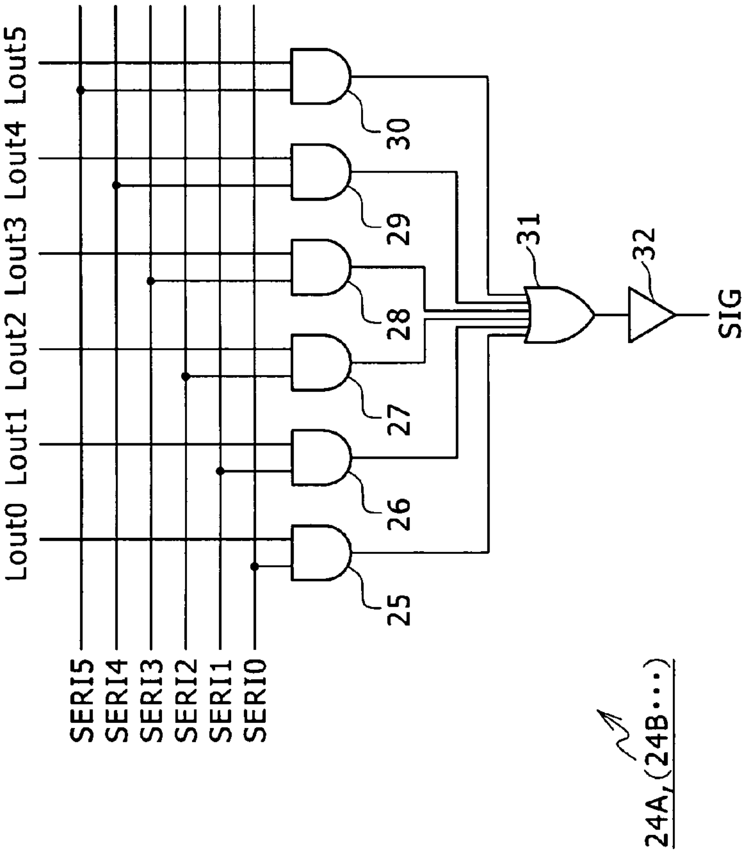
FIG. 6 is a block diagram showing a parallel-serial conversion circuit in the horizontal driver of FIG. 5.
Figures 7, 7B, 7C:
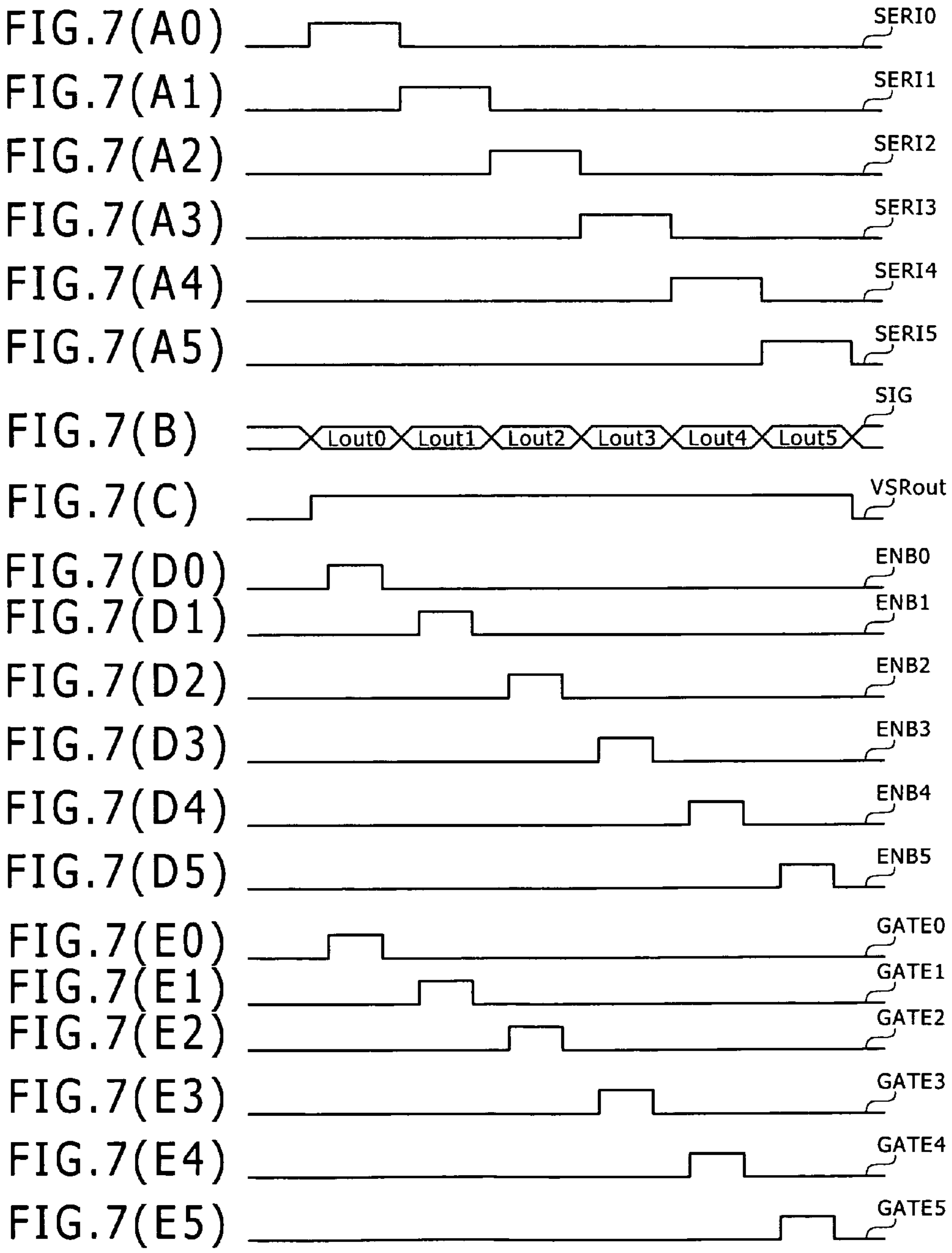
FIG. 7 is a time chart for explaining the operation of the horizontal driver of FIG. 5.
Figure 8:
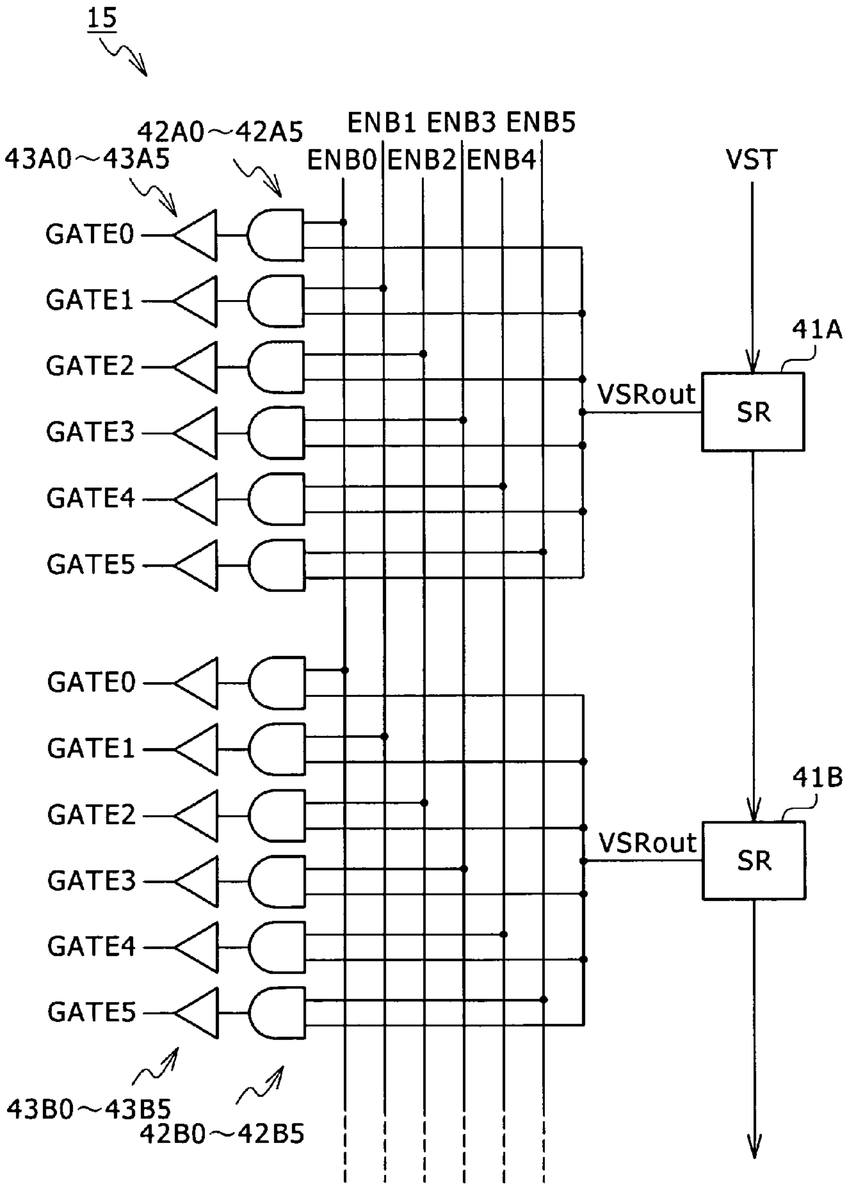
FIG. 8 is a block diagram showing a vertical driver in the image display device of FIG. 1.

Based on the above-described configuration, in this image display device 51 (FIG. 9), image data SDI as serial data input via the interface 11 is separated for the odd-numbered lines and the even-numbered lines so as to be input to the horizontal drivers 12O and 12E, and is distributed therein toward the respective signal lines SIG of the display unit 52 (FIG. 5), followed by being converted into one-bit serial data and output to the respective signal lines SIG of the display unit 52 (FIG. 6). Furthermore, in linkage with the driving of the signal lines SIG by the horizontal drivers 12O and 12E, the gate signal GATE is produced by the vertical driver 15 and supplied to the display unit 52, so that the image data output from the horizontal drivers 12O and 12E to the signal lines SIG is sequentially input to the corresponding pixel so as to be used for displaying. This allows the image display device 51 to display an image based on the image data SDI on the display unit 52.

In each pixel 52A in the display unit 52 (FIGS. 10, 11, and 13), the liquid crystal cell 55 whose counter electrode is formed of one large-area electrode 53 is provided. Through control of the ON/OFF of the switch circuits 56 and 57 in a complementary manner, one of the drive signal FRP and the drive signal XFRP, which are in phase and in antiphase, respectively, with the common voltage VCOM applied to the common electrode of the liquid crystal cell 55, is selectively applied to the electrode 53. Thus, in the case of forming the liquid crystal cell 55 of the normally black mode, the pixel 52A can be turned to the non-displaying state by applying the in-phase drive signal FRP to the electrode 53 through the control of the switch circuits 56 and 57. In contrast, the pixel 52A can be turned to the displaying state by applying the in-antiphase drive signal XFRP to the electrode 53.

In this image display device 51, through control by the gate signals GATE0 to GATE5, the logical values of the image data output to the signal line SIG as a bit serial are sequentially written to the memories 62 provided in the drive circuits 58A to 58F on a bit-by-bit basis. The switch circuits 56 and 57 are controlled in accordance with the written logical value. The periods during which the drive circuits 58A to 58F are entrusted with the control of the switch circuits 56 and 57 are so designed by the selection signals SEP0 to SEP5 as to each correspond to the bit of the image data for which driving is handled by a corresponding one of the drive circuits 58A to 58F. Specifically, the periods are so designed that the drive circuits 58A to 58F to handle an upper-level bit is entrusted with the driving for a longer period arising from multiplication by a higher power of two.

Based on this configuration, in this image display device 51, the input image data is recorded in the memory part in each pixel 52A, and the grayscale is represented by time-division driving in accordance with the input image data held in this memory part.

Specifically, in each pixel 52A, the periods of the displaying state and the non-displaying state are switched in accordance with the logical values of the respective bits recorded in the memories 62 in the drive circuits 58A to 58F, so that the grayscales corresponding to the number of bits of the image data SDI can be represented due to the integral effect for human eyes. This allows the image display device 51 to drive the liquid crystal cell 55 based on the multi-bit memory system to thereby represent the grayscales corresponding to the number of bits of the image data SDI. Furthermore, the image display device 51 involves no need to provide the horizontal drivers 12O and 12E and so on with an analog-digital conversion circuit and so on, and thus can perform image displaying with a correspondingly-simplified entire configuration. In addition, due to an advantage that image data does not necessarily need to be written on a frame-by-frame basis, and so on, the power consumption can be reduced.

For the image displaying by such a multi-bit memory system, in this image display device 51, one pixel 52A is provided with one electrode 53, and the grayscale is represented by switching the driving of this electrode 53 based on time division. This feature can eliminate the useless region that exists among sub-pixels and does not contribute to displaying, unlike the multi-bit memory system based on the area-ratio grayscale system described above with FIG. 1, and thus can correspondingly prevent the lowering of the transmittance and reflectivity of one pixel, which allows image displaying with high efficiency.

Figure 3:
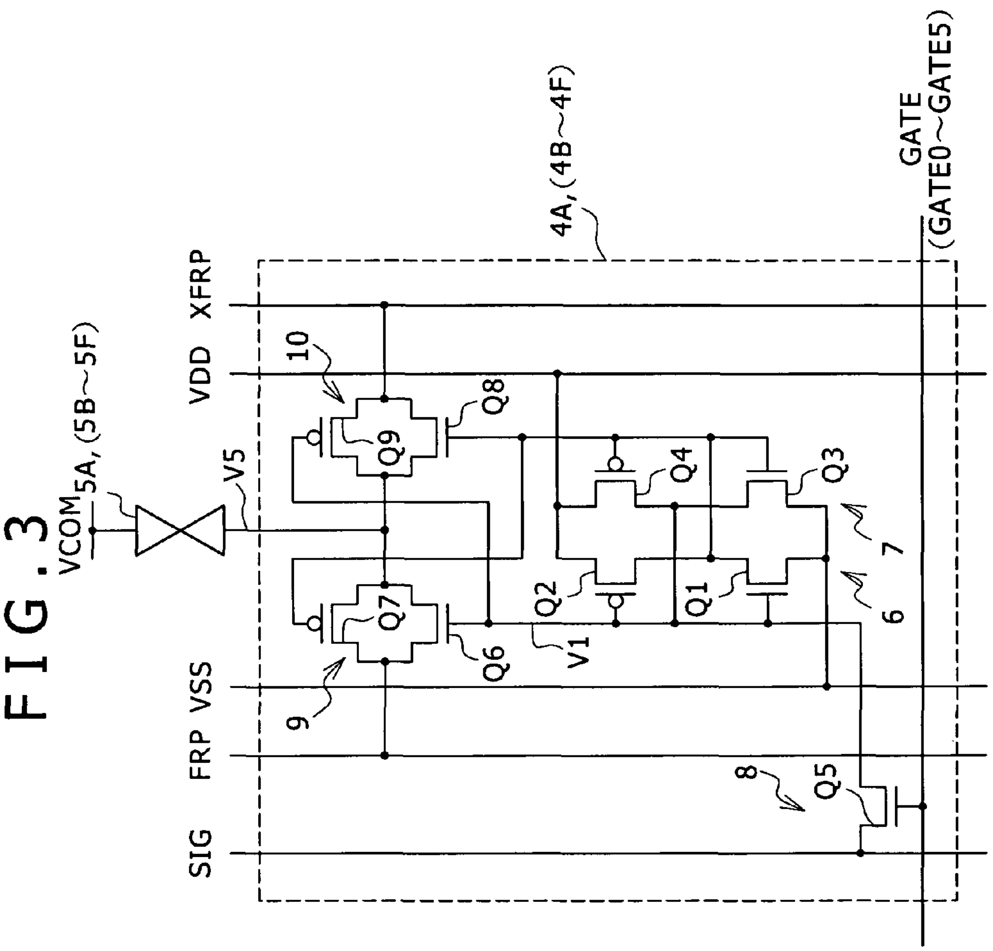
FIG. 3 is a connection diagram showing the configuration of a pixel circuit in the pixel of FIG. 2.
Figures 4A, 4B, 4C, 4D, 4E, 4F, 4G:
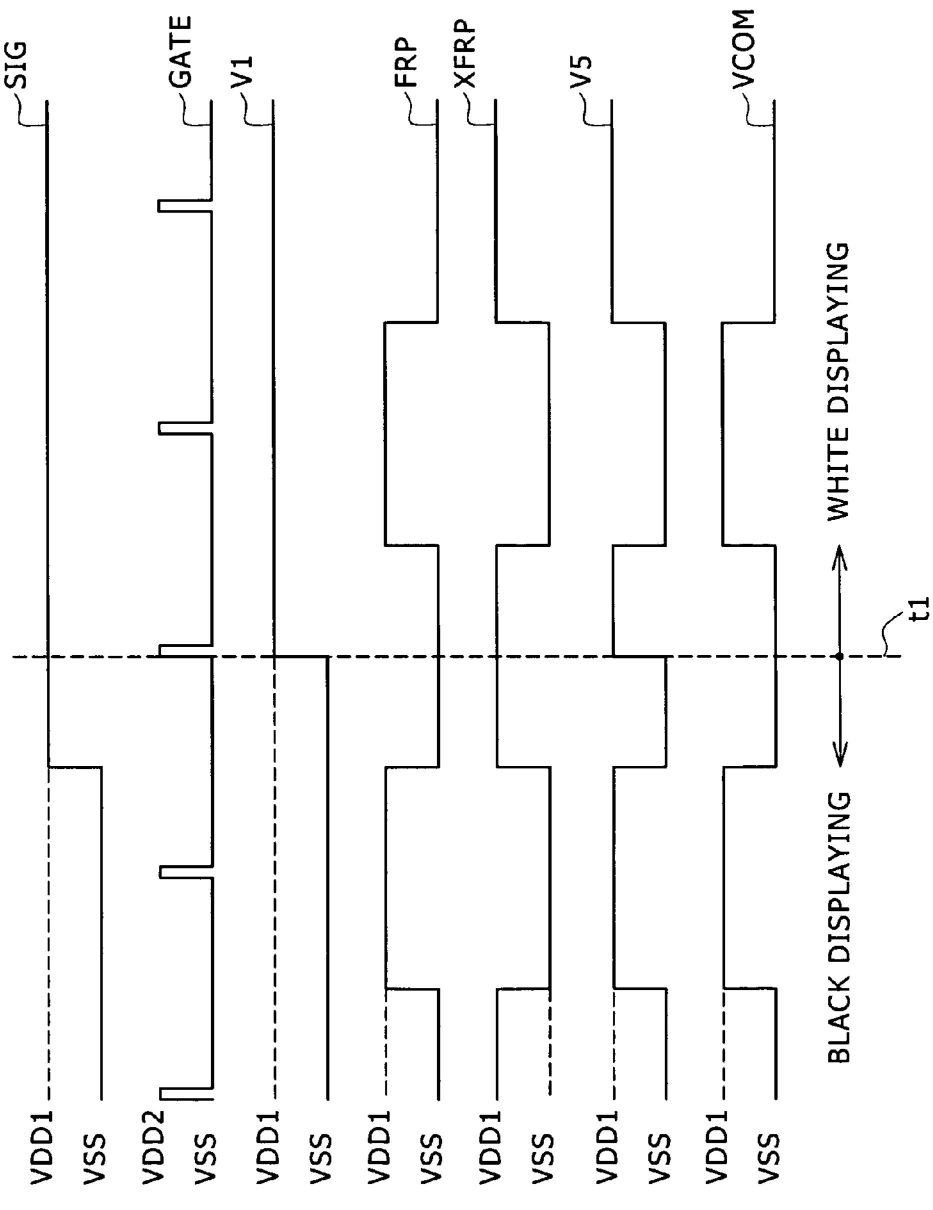
FIG. 4 is a time chart for explaining the operation of the configuration of FIG. 3.

Furthermore, because one pixel 52A can be formed with one electrode 53, variation in the centroid position dependent upon the grayscale, which is involved by the area-ratio grayscale system, can be prevented, which can avoid the occurrence of a fixed pattern. In addition, it is also possible to avoid the limitation on the resolution and the number of grayscales due to the processing accuracy of the sub-pixel having the smallest area. Moreover, it is unnecessary that the switch circuit relating to switching between the in-phase and in-antiphase drive signals is assigned to each bit unlike the case of the multi-bit memory system, and it is sufficient that the switch circuit for selectively outputting to the switch circuits 56 and 57 the output of the memory 62 allocated to a respective one of the bits is assigned to each bit. Therefore, the number of semiconductor elements can be correspondingly reduced and thus the entire configuration can be simplified. Consequently, the limitation on the resolution and the number of grayscales due to the number of semiconductor elements can also be avoided. Specifically, four transistors Q6 to Q9 (FIG. 3) can be omitted for each bit. Instead, four transistors Q51 to Q54 serving as the switch circuits 56 and 57 are provided for the entire pixel circuit, and two transistors Q65 and Q66 are provided for each bit. Therefore, in the grayscale representation based on six bits according to this embodiment, the number of transistors can be reduced to 46, in contrast to the multi-bit memory system based on the area-ratio grayscale system, which requires 54 transistors.

Thus, image displaying can be performed with higher efficiency and higher image quality compared with conventional techniques.

The above-described feature is equivalent to the fact that the image display device 51 according to this embodiment represents the grayscale through control of the pulse width of the drive signal applied to the liquid crystal cell. As such a grayscale representation method, there has been conventionally known a grayscale representation method based on a pulse width modulation system for an STN (super twisted nematic) liquid crystal. However, in the pulse width modulation system for an STN liquid crystal, a display unit is driven based on an analog system. In contrast, the drive system according to the embodiment is a multi-bit memory system. Therefore, both the systems are fundamentally different from each other.

(3) Advantageous Effects of First Embodiment

According to the above-described configuration, input image data is recorded in the memory part of each pixel, and the grayscale is represented by time-division driving in accordance with the input image data held in the memory part. By this feature, in image displaying by the multi-bit memory system, images can be displayed with higher efficiency and higher image quality compared with conventional techniques.

More specifically, each pixel is provided with plural one-bit memories that each acquire and record therein the logical value of a respective one of bits of the input image data. Furthermore, for the period corresponding to the position of the bit of the input image data handled by a respective one of the plural memories, the data recorded in the respective one of the plural memories is selectively output to the switch circuit, so that the signal applied to the electrode of the pixel is switched in accordance with the output signal of this switch circuit. This feature allows displaying of an image having a higher image quality with a simplified configuration compared with conventional techniques.

Moreover, the input image data as serial data based on a bit serial is output from the horizontal drivers to the signal lines, and the logical value of each bit of this input image data is recorded in the memory and used for displaying in each pixel. This feature can reduce the number of signal lines and thus can simplify the configuration of the display unit.

(4) Second Embodiment

Figure 15:
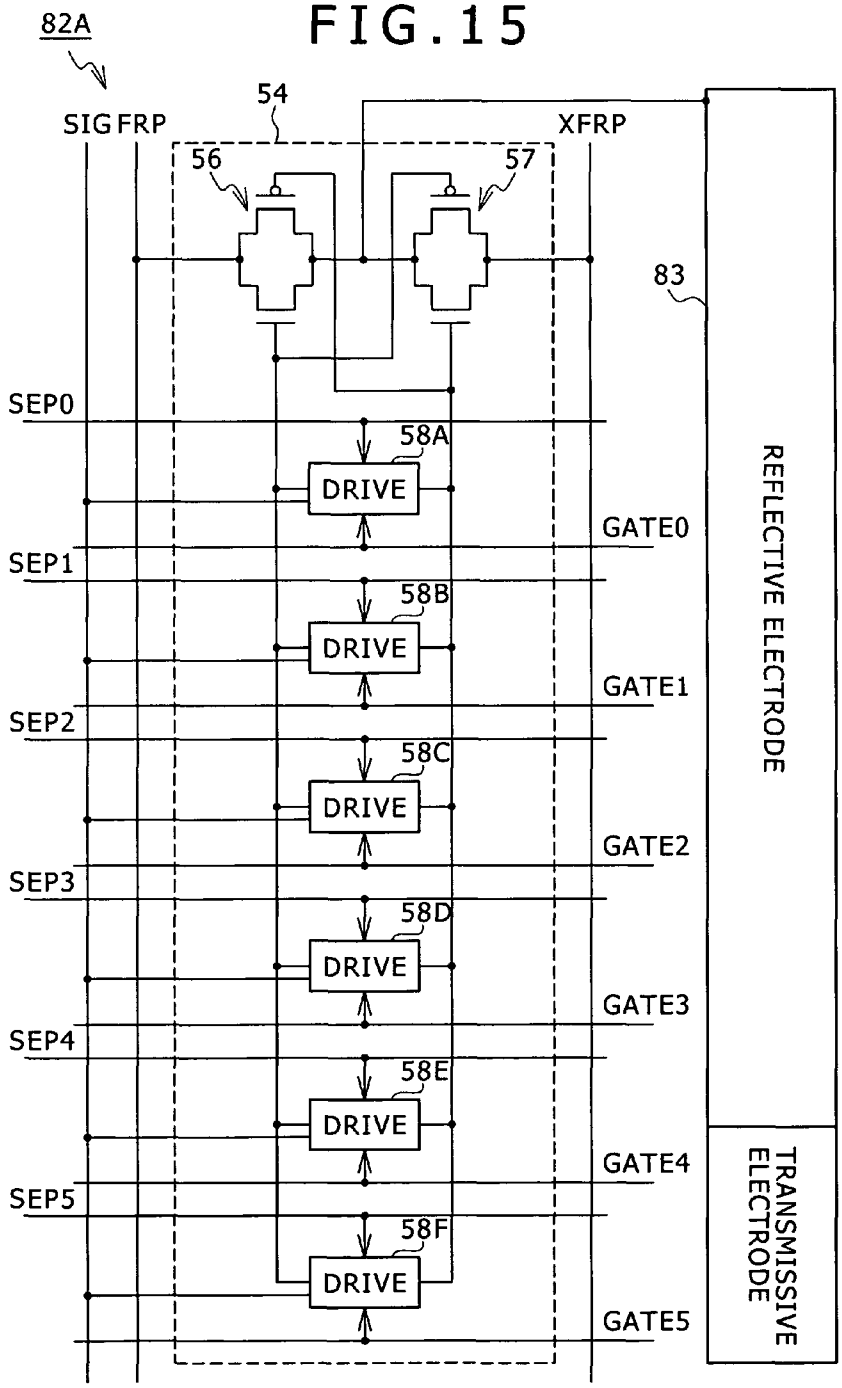
FIG. 15 is a connection diagram showing one pixel applied to an image display device according to a second embodiment of the present invention.

FIG. 15 is a connection diagram for showing, based on comparison with FIG. 10, one pixel in a display unit applied to an image display device according to a second embodiment of the present invention. In the image display device according to this embodiment, an electrode 83 relating to this pixel 82A is formed by the combination of a transparent electrode and a reflective electrode. The image display device according to this embodiment is formed to have the same configuration as that of the image display device 51 of the first embodiment, except that this pixel configuration is different.

According to this embodiment, also when the electrode of the liquid crystal cell is formed by the combination of a transparent electrode and a reflective electrode, the same advantageous effects as those by the first embodiment can be achieved.

(5) Third Embodiment

Figure 16:
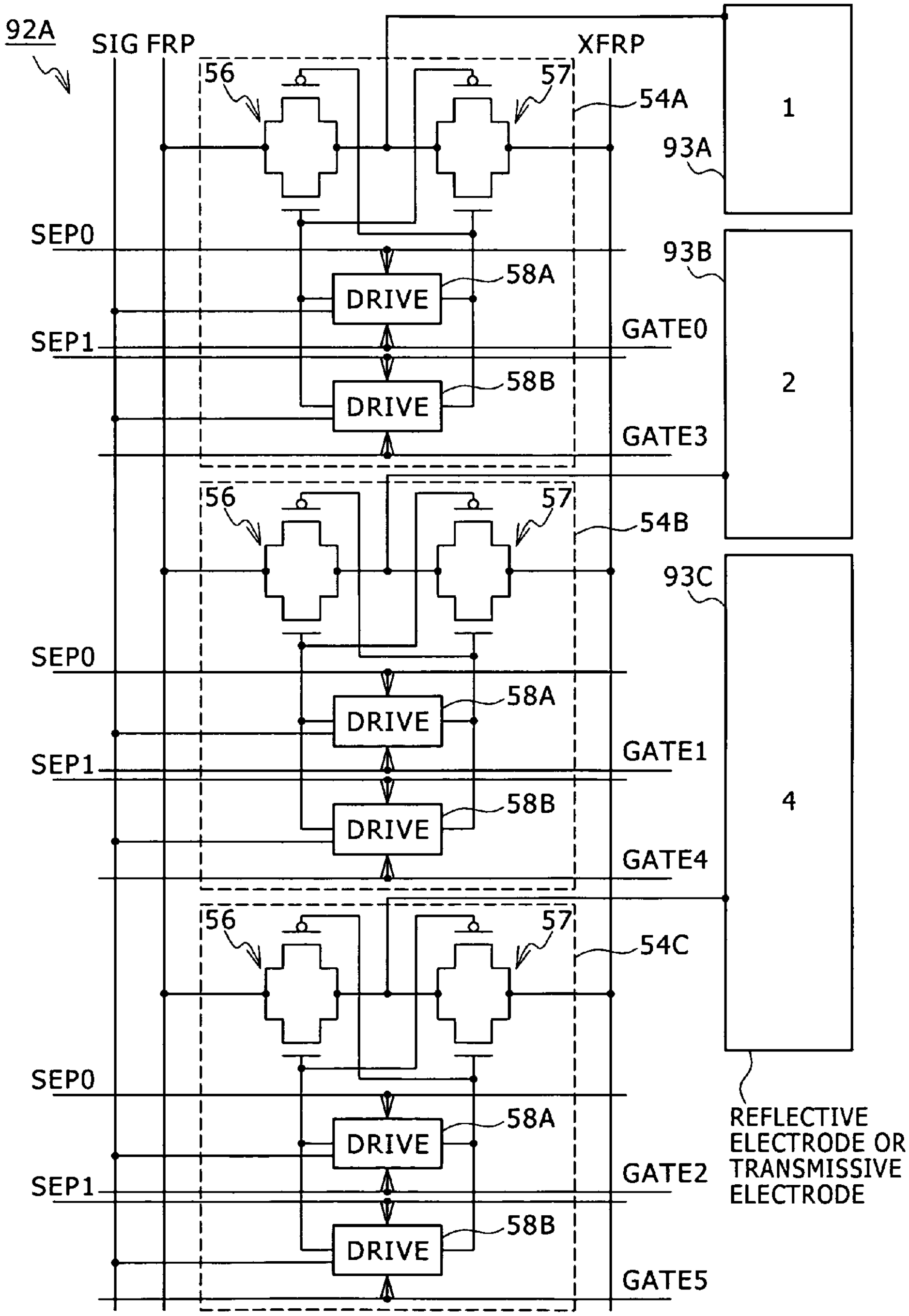
FIG. 16 is a connection diagram showing one pixel applied to an image display device according to a third embodiment of the present invention.

FIG. 16 is a connection diagram for showing, based on comparison with FIG. 10, one pixel in a display unit applied to an image display device according to a third embodiment of the present invention. In this third embodiment, the grayscale is represented based on the combination with the area-ratio grayscale method. Therefore, in this embodiment, the electrode of the liquid crystal cell is composed of plural sub-electrodes. Furthermore, for the respective bits of input image data, the values arising from multiplication of the area of the sub-electrode used for displaying by the length of the drive period are so designed as to have a relationship of the ratio of powers of two each corresponding to a respective one of the bit positions.

Specifically, a pixel 92A is formed to include three sub-electrodes 93A, 93B, and 93C: this number of sub-electrodes is smaller than the number of bits of image data. The areas of these three sub-electrodes 93A, 93B, and 93C are designed to have a relationship among powers of two: the area ratio is set to 1:2:4.

The sub-electrodes 93A, 93B, and 93C are provided with pixel circuits 54A, 54B, and 54C, respectively, that each handle two bits. For each of the pixel circuits 54A, 54B, and 54C, the lengths of the periods during which the drive circuits 58A and 58B, respectively, are entrusted with control of the switch circuits 56 and 57 are designed to have a relationship of a ratio of 1:8, and selection signals EP0 and EP1 are so supplied from the timing generator as to match with this period design.

Three bits from the least significant bit of the input image data are sequentially assigned to the sub-electrodes in the order from the sub-electrode 93A having the smallest area to the sub-electrodes 93B and 93C having the large area. Furthermore, the subsequent upper three bits are sequentially assigned to the sub-electrodes in the same order. The image display device according to this embodiment is formed to have the same configuration as those of the image displays according to the above-described embodiments, except that these configurations are different.

According to this embodiment, by representing the grayscale based on the combination with the area-ratio grayscale method, the number of kinds of selection signals SEP can be decreased. This simplifies the interconnects and enhances the layout efficiency correspondingly, and the same advantageous effects as those by the first embodiment can be achieved. Furthermore, the combination with the area-ratio grayscale system can enhance the flexibility in the pixel design.

(6) Fourth Embodiment

Figure 17:
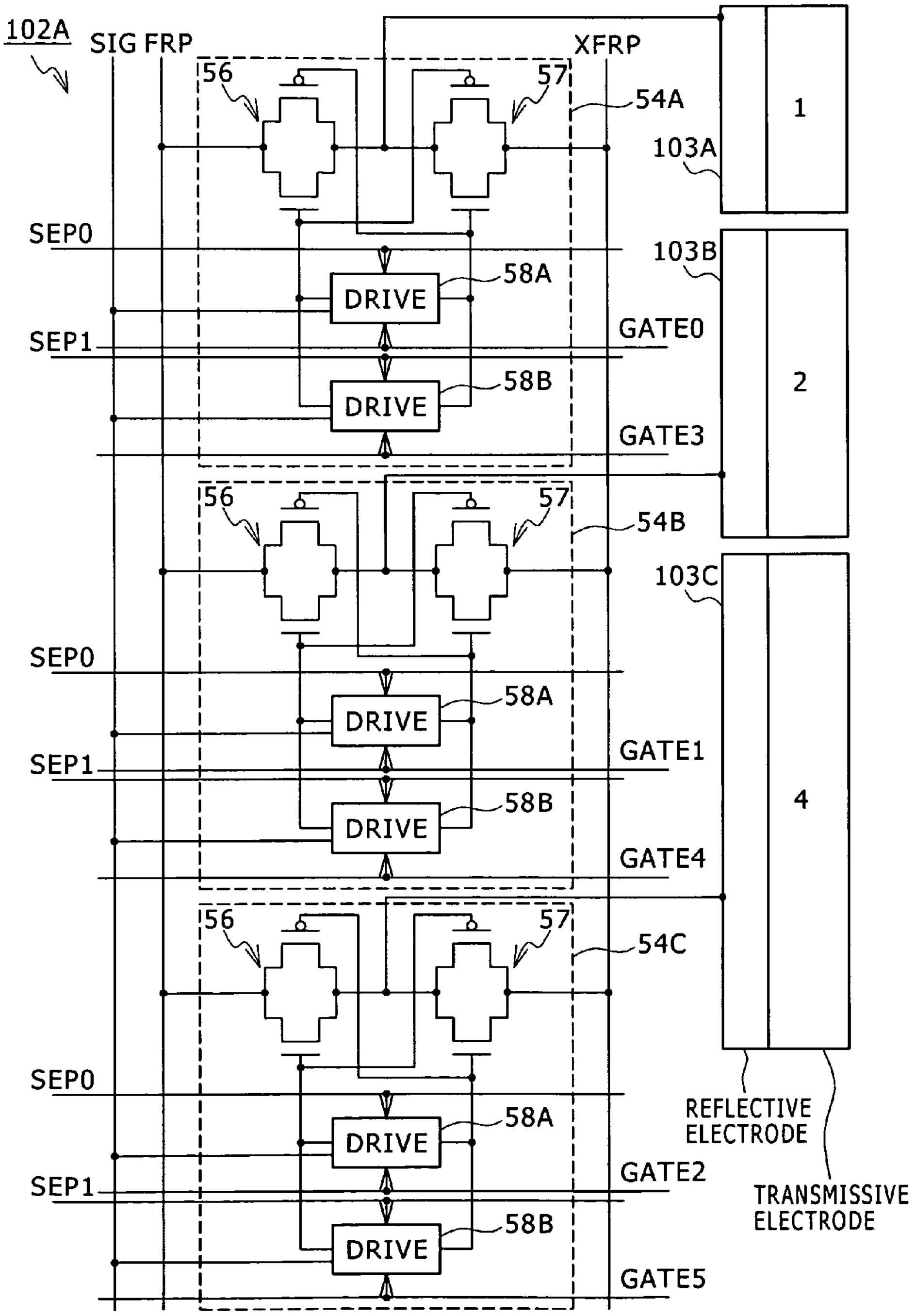
FIG. 17 is a connection diagram showing one pixel applied to an image display device according to a fourth embodiment of the present invention.

FIG. 17 is a connection diagram for showing, based on comparison with FIG. 16, one pixel in a display unit applied to an image display device according to a fourth embodiment of the present invention. In the image display device according to this embodiment, sub-electrodes 103A, 103B, and 103C relating to this pixel 102A are each formed by the combination of a transparent electrode and a reflective electrode. The image display device according to this embodiment is formed to have the same configuration as those of the image display devices according to the above-described embodiments, except that this pixel configuration is different.

According to this embodiment, also when the electrode of the liquid crystal cell is formed by the combination of a transparent electrode and a reflective electrode, the same advantageous effects as those by the third embodiment can be achieved.

(7) Fifth Embodiment

Figure 18:
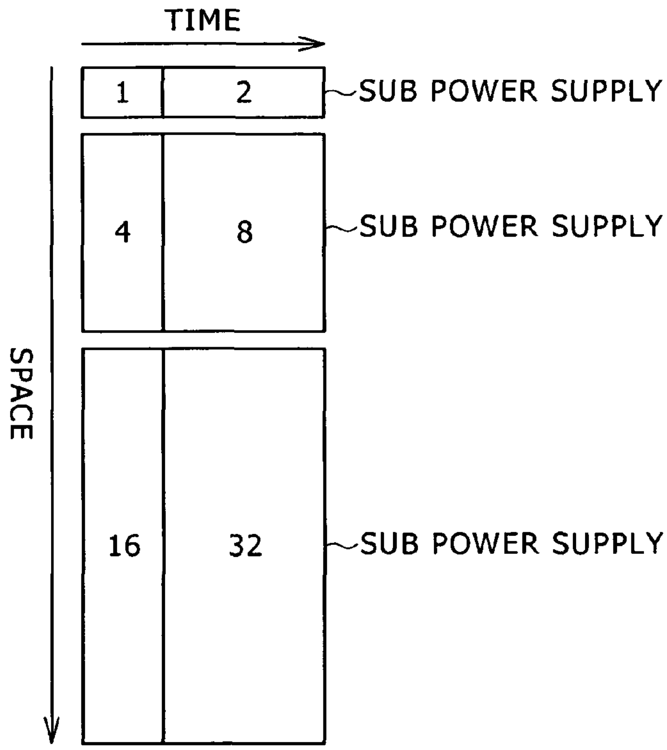
FIG. 18 is a plan view showing an electrode in a pixel applied to an image display device according to a fifth embodiment of the present invention.
Figure 19:
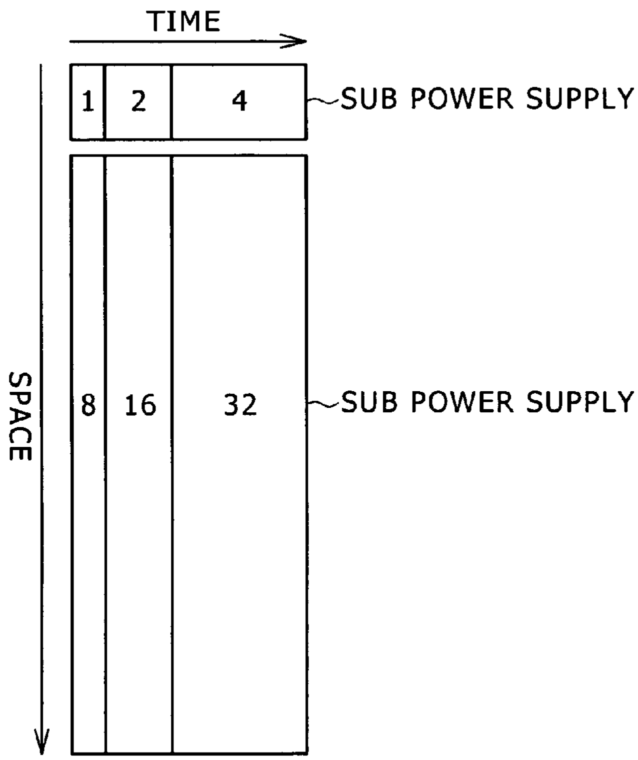
FIG. 19 is a plan view showing an electrode in a pixel according to an example different from the example of FIG. 18.
Figure 20:
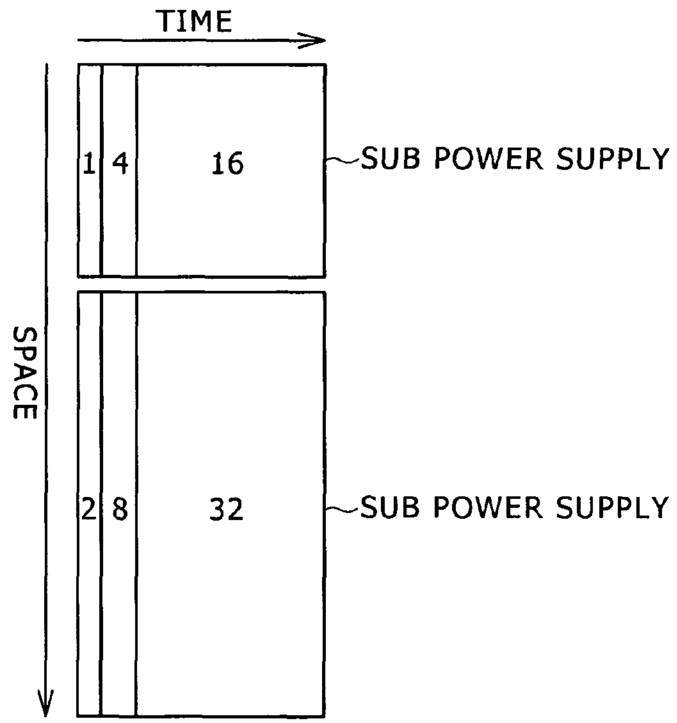
FIG. 20 is a plan view showing an electrode in a pixel according to an example different from the examples of FIGS. 18 and 19.

FIGS. 18 to 20 are plan views showing grayscale representation methods based on the combination with the area-ratio grayscale method, according to other examples different from the third and fourth embodiments. In the grayscale representation based on the combination with the area-ratio grayscale method, for the respective bits of input image data, the values arising from multiplication of the area of the sub-electrode used for displaying by the length of the drive period are so designed as to have a relationship among powers of two each corresponding to a respective one of the bit positions. Various combinations will be available as those between the areas and the lengths. In the example of FIG. 18, the ratio of the areas of the sub-electrodes is set to 1:4:16, and the ratio of the lengths of the drive periods is set to 1:2. In the example of FIG. 19, the ratio of the areas of the sub-electrodes is set to 1:8, and the ratio of the lengths of the drive periods is set to 1:2:4. In the example of FIG. 20, the ratio of the areas of the sub-electrodes is set to 1:2, and the ratio of the lengths of the drive periods is set to 1:4:8. The image display device according to this embodiment is formed to have the same configuration as those of the image displays according to the above-described embodiments, except that these configurations are different.

Also when the ratio of the areas of the sub-electrodes and the ratio of the lengths of the drive periods are variously varied like this embodiment, the same advantageous effects as those by the third and fourth embodiments can be achieved.

(8) Sixth Embodiment

Figure 13:
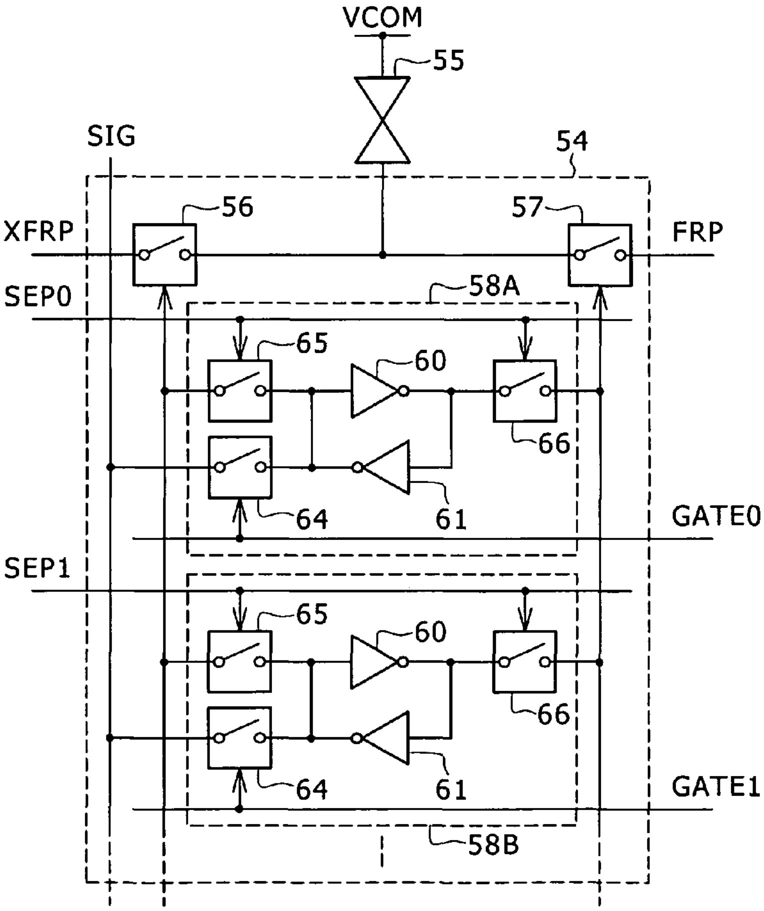
FIG. 13 is a connection diagram showing an equalizing circuit of the configuration of FIG. 10.
Figure 21:
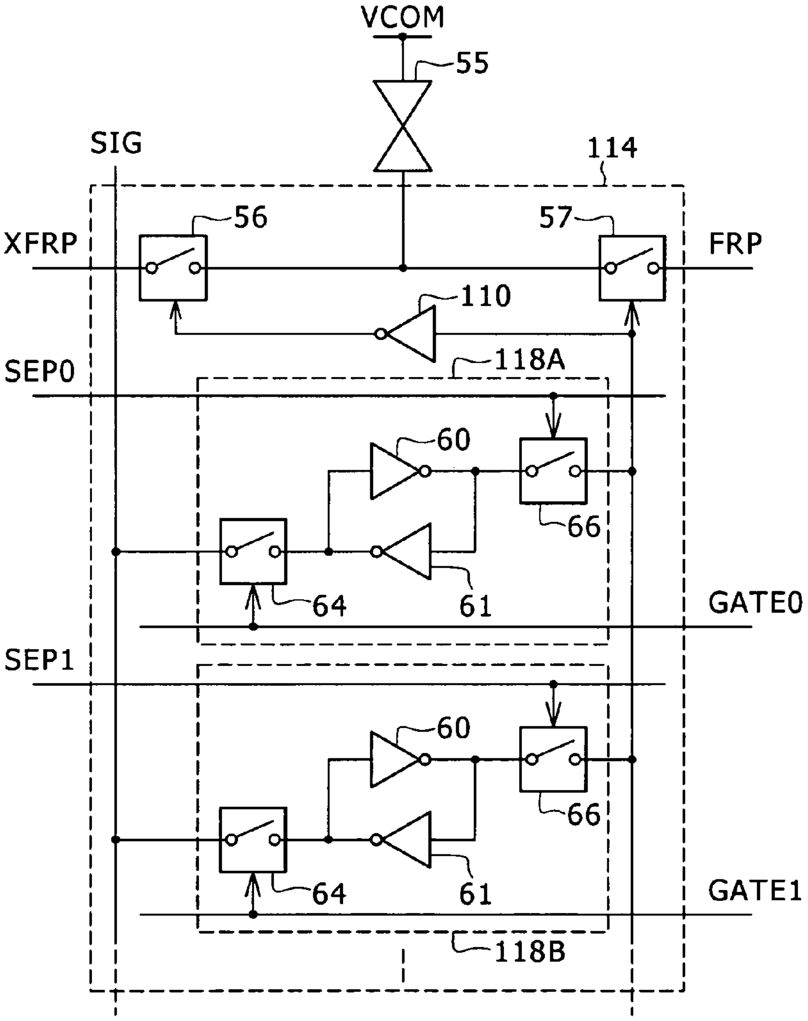
FIG. 21 is a connection diagram showing a pixel circuit according to a sixth embodiment of the present invention.
Figure 22:
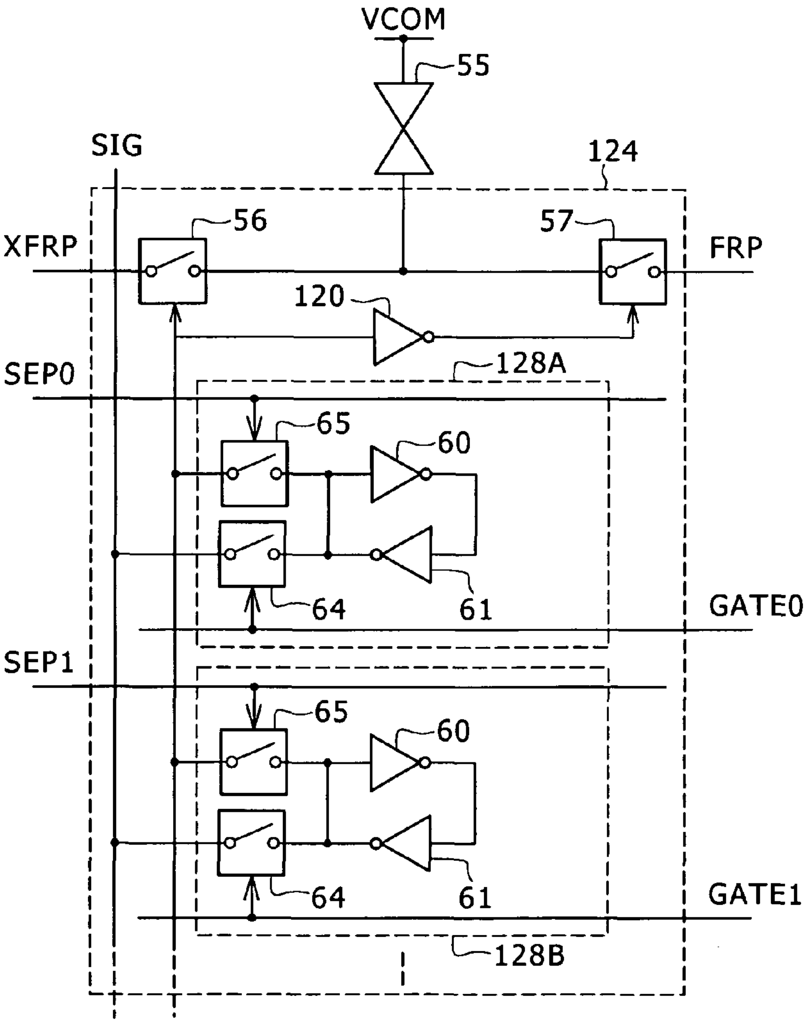
FIG. 22 is a connection diagram showing a pixel circuit according to an example different from the example of FIG. 21.
Figure 23:
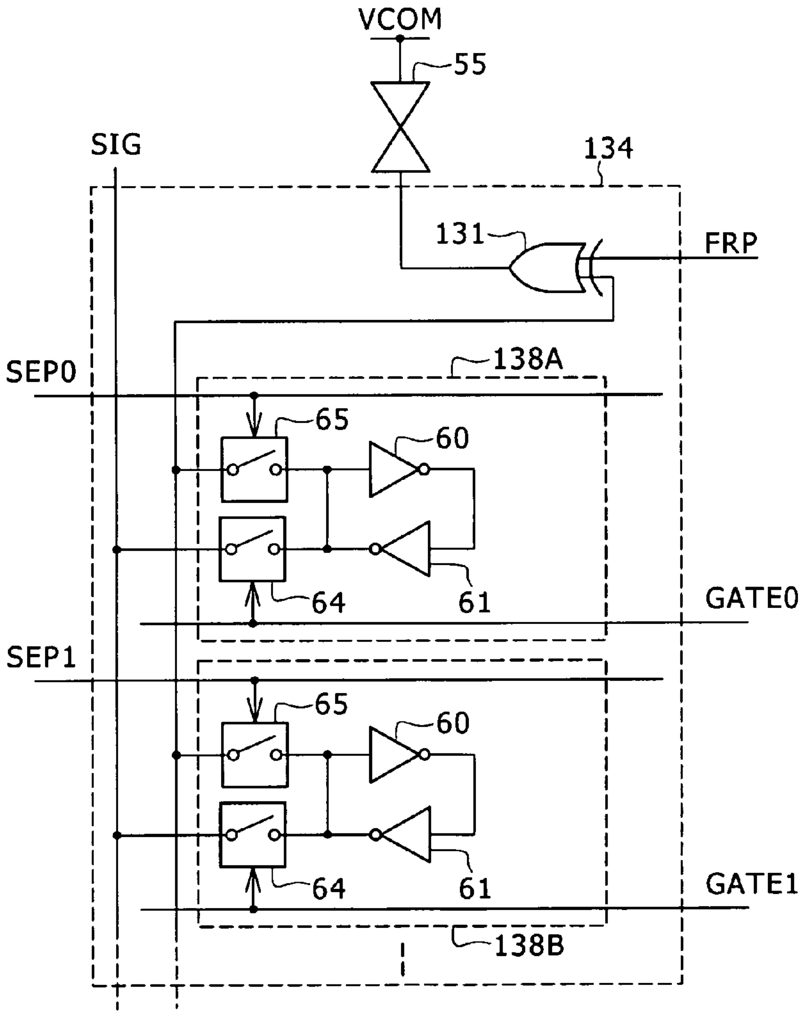
FIG. 23 is a connection diagram showing a pixel circuit according to an example different from the examples of FIGS. 21 and 22.

FIGS. 21 to 23 are connection diagrams for showing, based on comparison with FIG. 13, the configurations of other drive circuits for the liquid crystal cell. To the time-division driving of the liquid crystal cell, any of various configurations can be applied. In the example of FIG. 21, the switch circuit 56 is driven by inverting the drive signal for the switch circuit 57 by an inverter 110. Furthermore, the outputs from drive circuits 118A and 118B are collected on one channel, and the switch circuits 65 are omitted. In the example of FIG. 22, the switch circuit 57 is driven by inverting the drive signal for the switch circuit 56 by an inverter 120. Furthermore, the outputs from drive circuits 128A and 128B are collected on one channel, and the switch circuits 66 are omitted. In the example of FIG. 23, the switch circuits 56 and 57 and the inverter 120 in FIG. 22 are replaced by an exclusive-OR circuit 131, and the drive signal XFRP is produced from the drive signal FRP in the pixel circuit. The image display device according to this embodiment is formed to have the same configuration as those of the image display devices according to the above-described embodiments, except that these configurations are different.

Also when any of various configurations is applied to the drive circuit for the liquid crystal cell like this embodiment, the same advantageous effects as those by the above-described embodiments can be achieved.

(9) Seventh Embodiment

Figure 24:
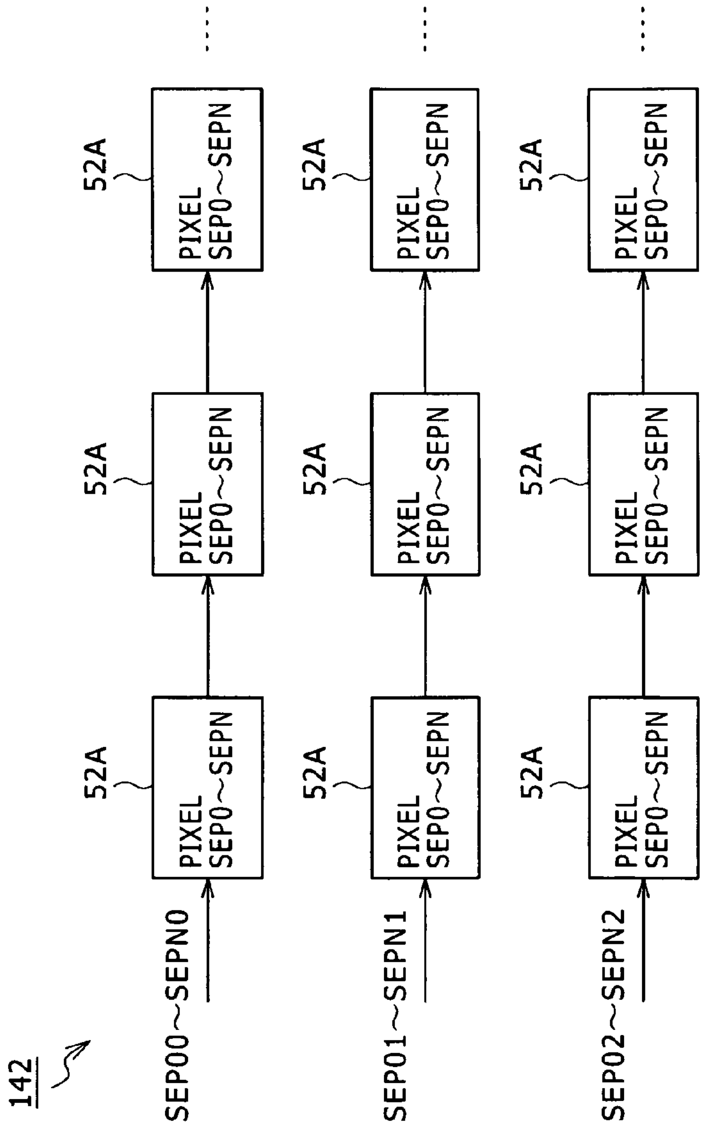
FIG. 24 is a block diagram for explaining driving of each pixel according to a seventh embodiment of the present invention.

FIG. 24 is a plan view showing the configuration of a display unit applied to an image display device according to a seventh embodiment of the present invention. The image display device according to this embodiment is formed to have the same configuration as those of the above-described embodiments, except that the configuration relating to this display unit 142 is different.

Figure 25:
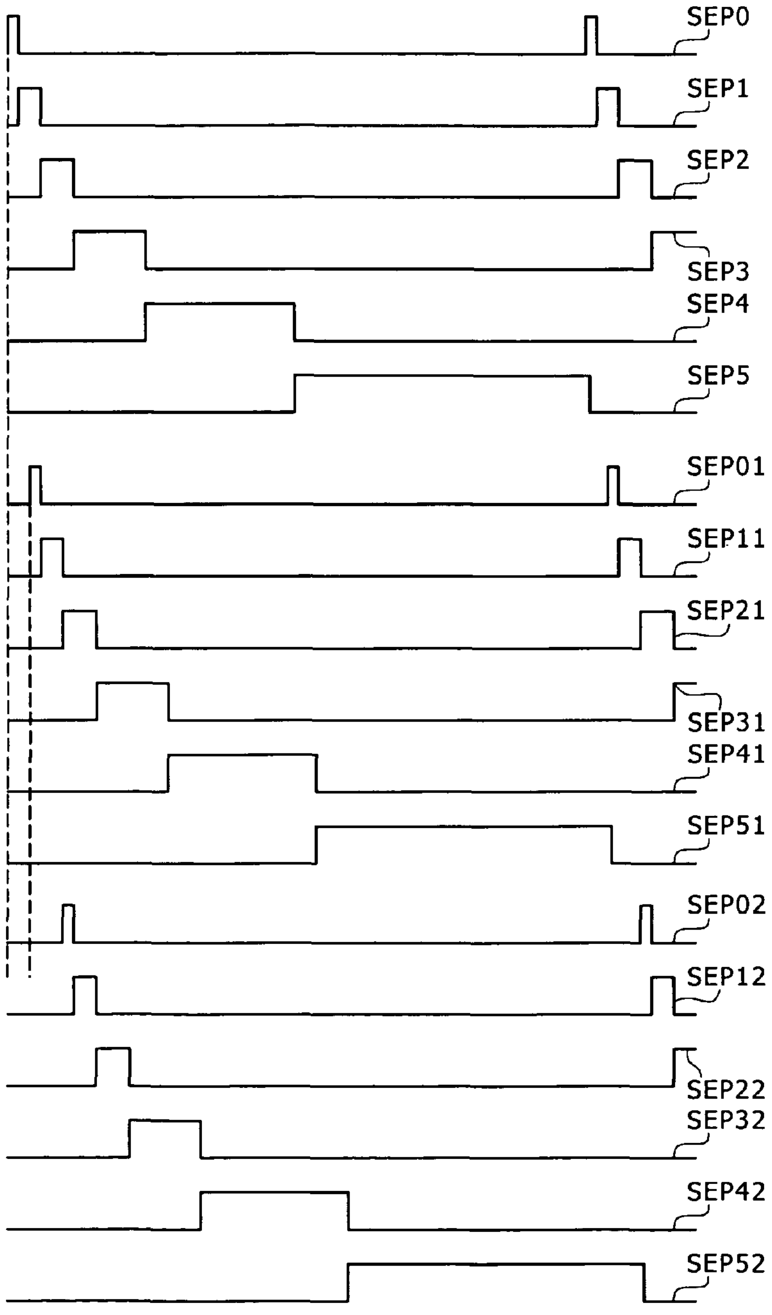
FIG. 25 is a time chart for explaining the driving of each pixel of FIG. 24.

In this embodiment, selection signals SEP0 to SEPN (SEP00 to SEPN0, SEP01 to SEPN1, SEP02 to SEPN2, . . . ) for controlling the time-division driving of the liquid crystal cell are so designed that the phases of these selection signals are different between adjacent lines, to thereby prevent flicker. As the method for varying the phases on a line-by-line basis, the polarities of the selection signals SEP0 to SEPN may be inverted on a line-by-line basis. Alternatively, as shown in FIG. 25, the phases of the selection signals SEP0 to SEPN may be sequentially shifted by a constant phase on a line-by-line basis. More alternatively, these schemes may be combined with each other. Furthermore, on the same line, the phases of these selection signals SEP0 to SEPN may be made different between consecutive frames.

By designing the selection signals for controlling the time-division driving of the liquid crystal cell in such a way that the phases of the selection signals are different between adjacent lines like this embodiment, flicker can be prevented, and the same advantageous effects as those by the above-described embodiments can be achieved.

(10) Eighth Embodiment

Figure 26:
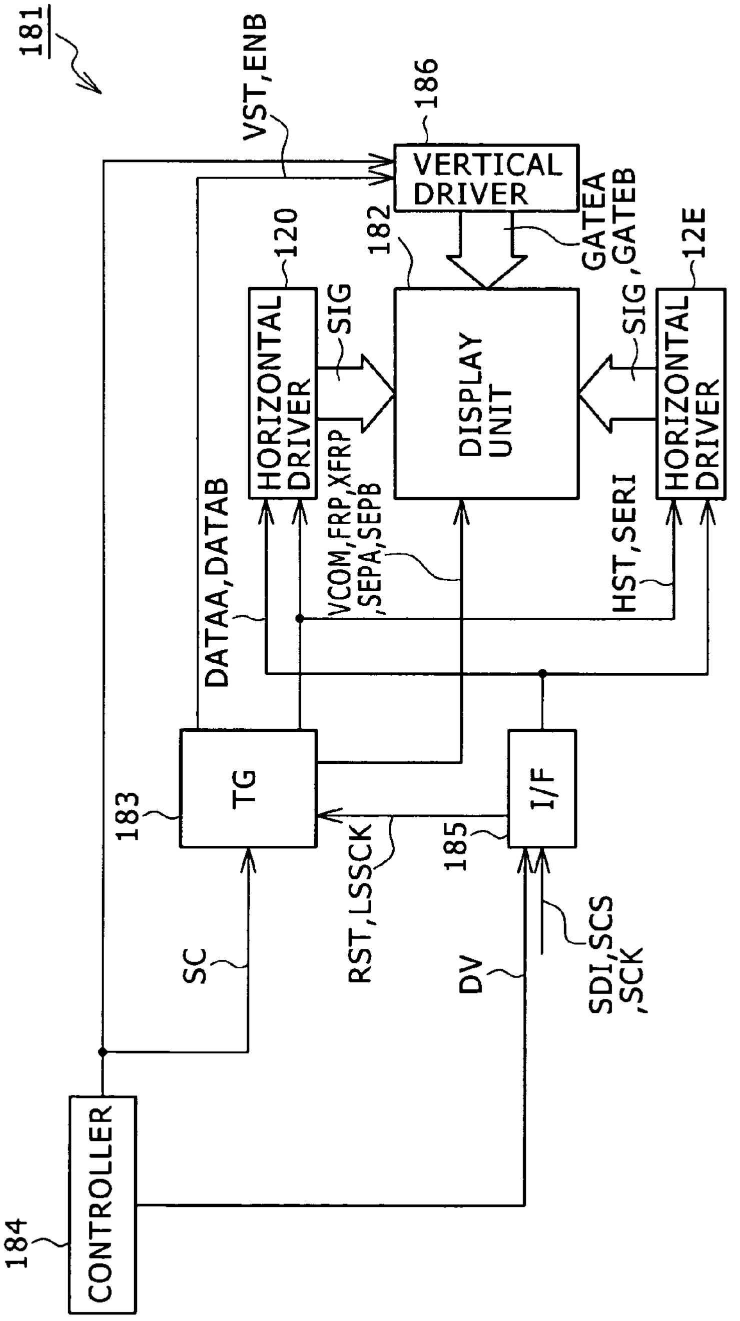
FIG. 26 is a block diagram showing an image display device according to an eighth embodiment of the present invention.

FIG. 26 is a block diagram for showing, based on comparison with FIG. 9, an image display device according to an eighth embodiment of the present invention. This image display device 181 is portable apparatus such as a cellular phone, electronic still-camera, or video camera. The image display device 181 switches displaying of a display unit 182 under control by a controller 184 that controls the entire operation by executing a program recorded in a memory not shown in response to operation by a user.

Figure 27:
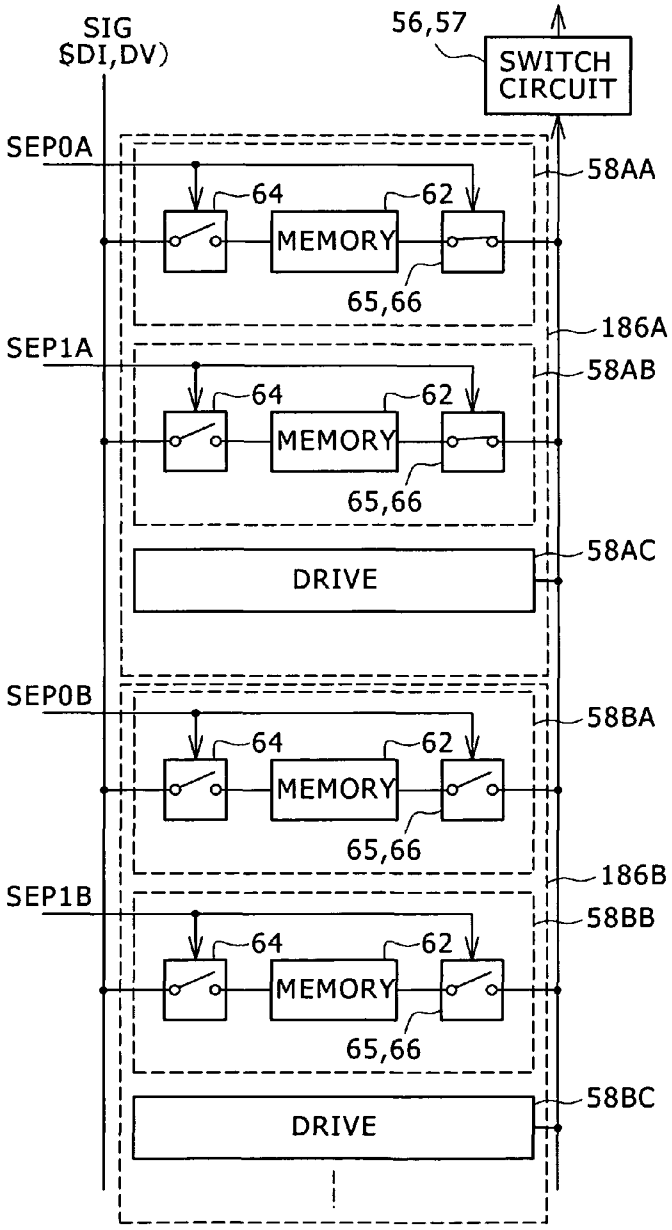
FIG. 27 is a connection diagram showing the configuration of one pixel in the image display device of FIG. 26.

As shown in FIG. 27, the display unit 182 is provided with a drive circuit group 186A of a first system and a drive circuit group 186B of a second system. The drive circuit group 186A includes drive circuits 58AA, 58AB, . . . that record image data output to the signal line SIG and drive the switch circuits 56 and 57. The drive circuit group 186B includes drive circuits 58BA, 58BB, . . . that record the image data and drive the switch circuits 56 and 57 similarly. The switch circuits 56 and 57 are controlled by the outputs from these two-system drive circuits 58AA, 58AB, . . . , 58BA, 58BB, . . . .

In matching with this configuration, a timing generator 183 (FIG. 26) selectively outputs two-system selection signals SEP0A to SEP5A and SEP0B to SEP5B corresponding to these two-system drive circuits 58AA, 58AB, . . . , 58BA, 58BB, . . . under control by the controller 184. This allows switching of the drive circuits that control the switch circuits 56 and 57 between these two-system drive circuits 58AA, 58AB, . . . , 58BA, 58BB, . . . .

Figure 28:
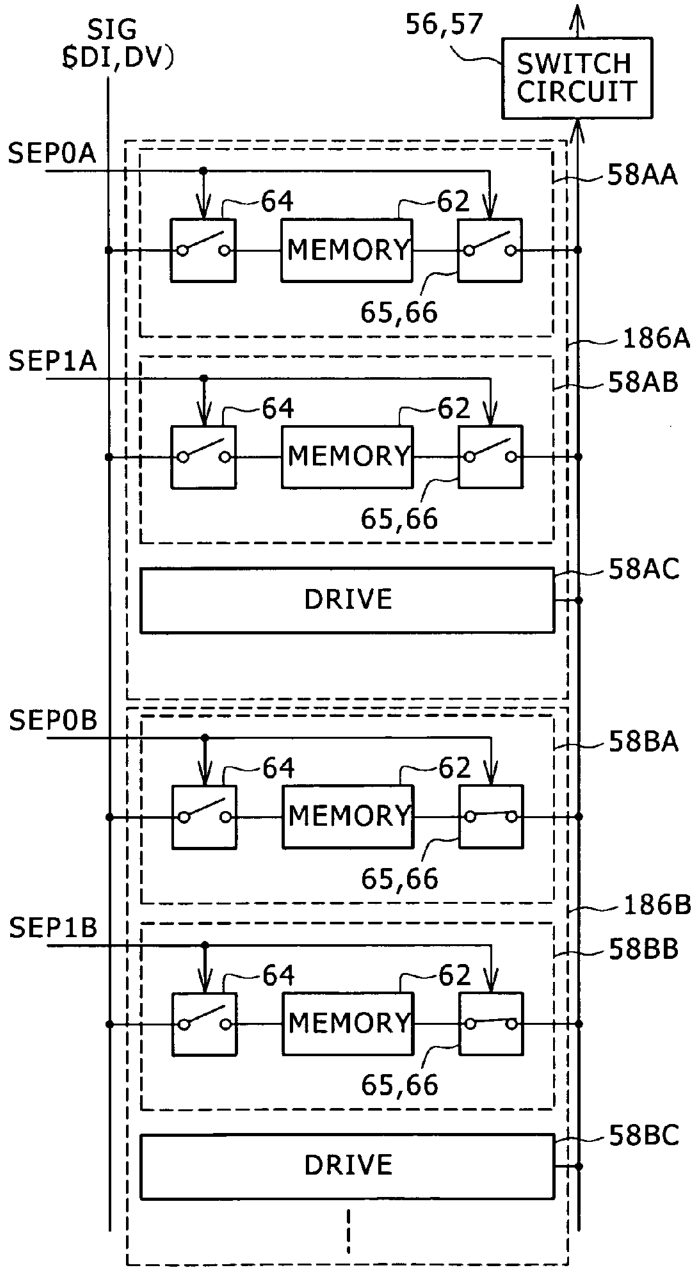
FIG. 28 is a connection diagram for explaining writing to the other system side in the configuration shown in FIG. 27.

Specifically, if an instruction to display a moving image arising from an imaging result or the like is issued by a user, as shown in FIG. 27, the selection signals SEP0A to SEP5A and SEP0B to SEP5B are so output that the switch circuits 56 and 57 are controlled by the drive circuits 58AA, 58AB, . . . relating to the first system. If an instruction to display an e-mail or the like is issued by a user, as shown in FIG. 28 based on comparison with FIG. 27, the selection signals SEP0A to SEP5A and SEP0B to SEP5B are so output that the switch circuits 56 and 57 are controlled by the drive circuits 58BA, 58BB, . . . of the second system.

An interface (I/F) 185 outputs image data DATAA and DATAB relating to these two-system drive circuit groups 186A and 186B based on time division, from video data SDI and image data DV produced by the controller 184, under control by the controller 184. Furthermore, a vertical driver 186 outputs gate signals GATEA and GATEB of the respective systems corresponding to the output of the image data DATAA and DATAB under similar control by the controller 184.

Figure 29A:
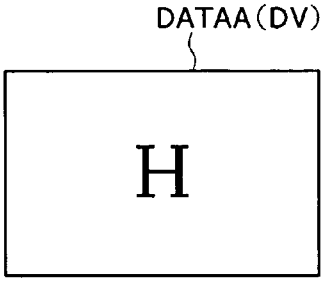
FIG. 29 is a plan view showing blanking displaying.
Figure 29B:
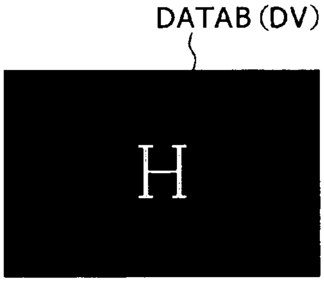

Upon detecting a trouble through monitoring of the operations of the respective units for example, the controller 184 produces the image data DV for displaying a symbol, message, or the like that alerts a user to the detected trouble. Furthermore, under control by the timing generator 183, this image data DV (DATAA) is stored in one system of the two-system drive circuit groups 186A and 186B as shown in FIG. 29. In addition, image data DV arising from inversion of the grayscales of this image data DV is produced, and this image data DV (DATAB) arising from the grayscale inversion is stored in the other system. After the image data are thus stored in the respective systems, the selection signals SEPA and SEPB are output in such a manner as to be switched with a cycle of plural frames under control by the timing generator 183. Due to this operation, the image displaying by the two-system drive circuits is switched with the cycle of plural frames, so that this alarm indication is displayed by blanking.

Figure 30A:
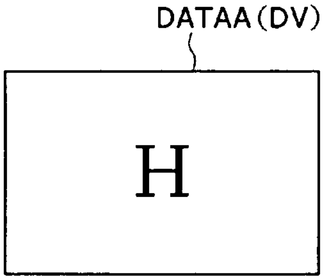
FIG. 30 is a plan view showing displaying by superimposing.
Figure 30B:
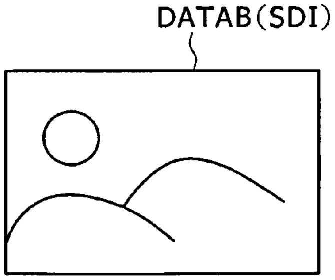
Figure 30C:
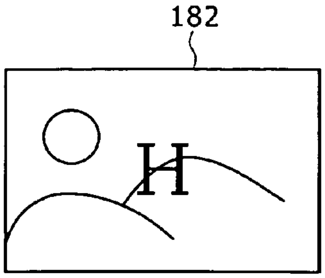

Furthermore, referring to FIG. 30, if the remaining battery power becomes low or if the free space of a recording medium becomes small for example, while an image based on the video data SDI is displayed by one of these two systems, the image data DV for displaying a symbol, message, or the like that alerts a user to these situations is produced, and this image data DV is stored in the remaining one system. The storing of this image data DV may be carried out in one or plural vertical blanking periods for example. Alternatively, it is possible to stop the writing of the video data SDI only for the one-frame period and carry out the storing in this period.

In this case, after thus storing the image data DV in the remaining one system, the controller 184 switches displaying between these two systems with the frame cycle, to thereby display a character, symbol, or the like relating to this alarm on a moving image in a superimposed manner.

According to this embodiment, each pixel is provided with two systems of the memory part for recording therein image data and the drivers for driving the liquid crystal cell based on time division in accordance with the recording of this memory part. With this feature, the same advantageous effects as those by the above-described embodiments can be achieved by switching display by two systems and ensuring a variety of functions.

(11) Ninth Embodiment

Figure 31:
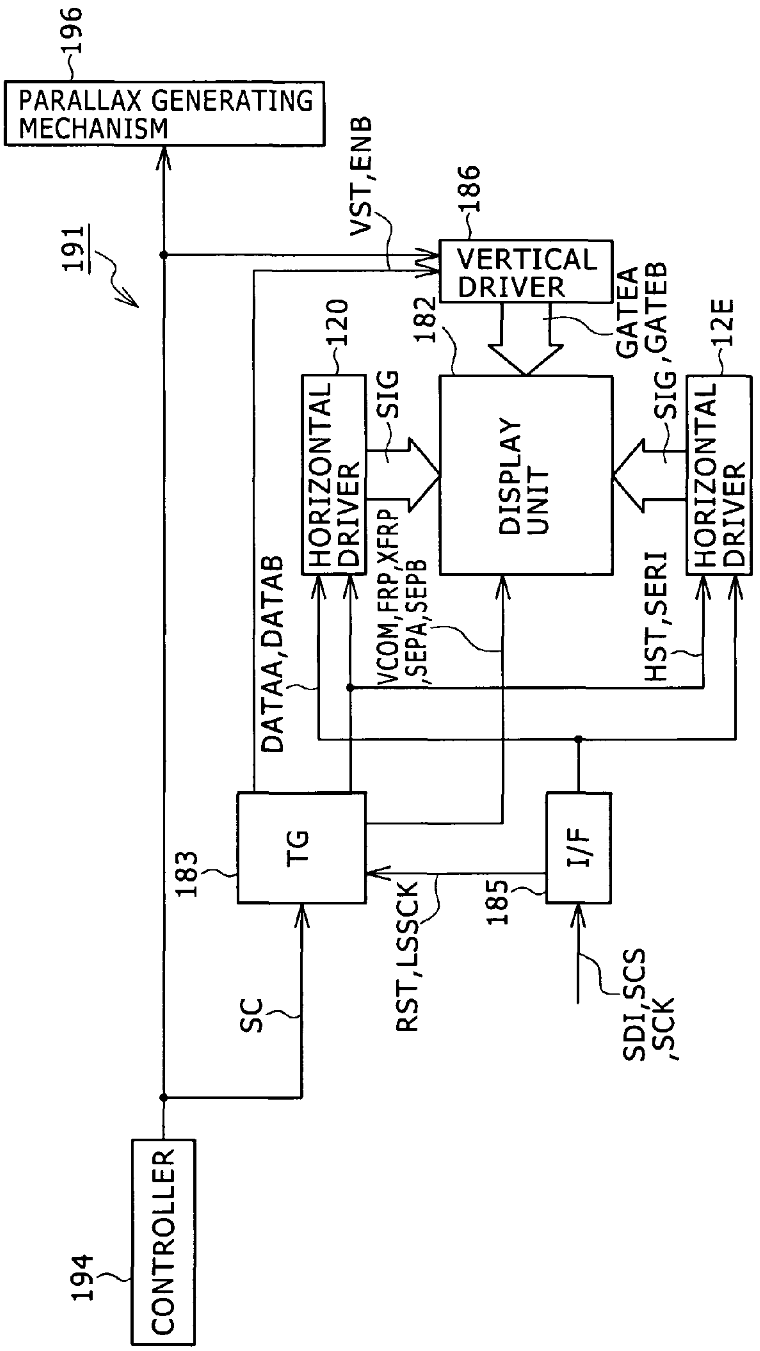
FIG. 31 is a block diagram showing an image display device according to a ninth embodiment of the present invention.

FIG. 31 is a block diagram for showing, based on comparison with FIG. 26, an image display device according to a ninth embodiment of the present invention. This image display device 191 is e.g. a monitor device, and video data SDI is input thereto. In this embodiment, the video data SDI is used for three-dimensional displaying, and is formed of a series of the alternate switching of image data for the right eye and image data for the left eye with the frame cycle. The image display device 191 is formed to have the same configuration as that of the above-described image display device 181 according to the eighth embodiment, except that the configuration relating to this video data SDI is different. The image display device 191 stores the right-eye image data and left-eye image data of the video data SDI used for three-dimensional displaying in the two-system drive circuit groups 186A and 186B provided in the display unit 182 alternately with the frame cycle. Furthermore, the image display device 191 displays by the display unit 182 the images based on the image data recorded in these two-system drive circuit groups 186A and 186B alternately with the frame cycle.

Figure 32:
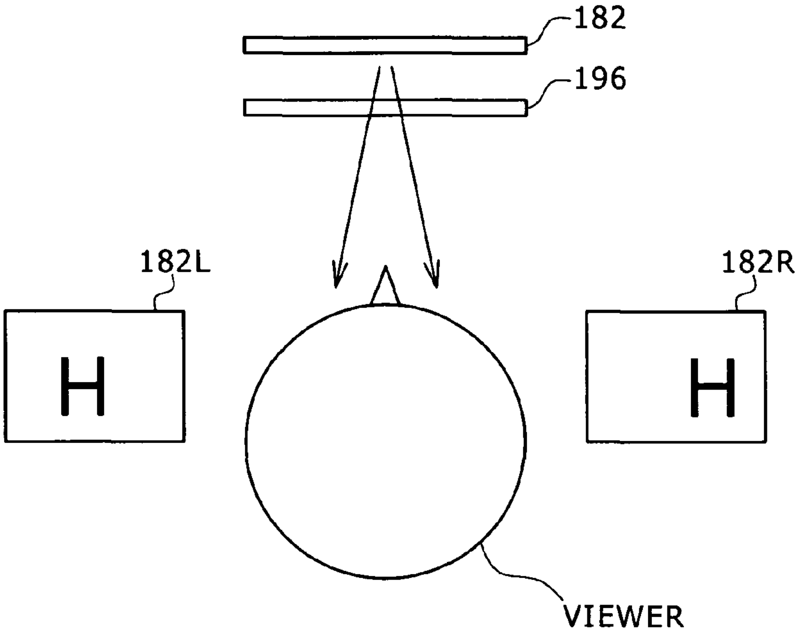
FIG. 32 is a schematic diagram for explaining three-dimensional displaying by the image display device of FIG. 31.

This image display device 191 controls the operation of a parallax generating mechanism 196 by a controller 194 in linkage with the switching of displaying. Thereby, as shown in FIG. 32, the image display device 191 yields a parallax between a display image 182R for the right eye and a display image 182L for the left eye, and provides a viewer with images for the right eye and images for the left eye based on the video data SDI. As such a parallax generating mechanism 196, various mechanisms such as a mechanism employing light deflection can be widely used.

According to this embodiment, two systems of the memory part for recording therein image data and the drivers for driving the liquid crystal cell based on time division in accordance with the recording of this memory part are provided and used for three-dimensional displaying. With this feature, the same advantageous effects as those by the above-described embodiments can be achieved.

(12) Tenth Embodiment

In the above-described embodiments, the time-division driving of each liquid crystal cell is carried out with the frame cycle. However, this drive cycle may be set to plural frames. If each liquid crystal cell is driven based on time division with a cycle of plural frames, a time allowance of the output of image data to the respective signal lines SIG arises. Based on this feature, this embodiment represents a large number of grayscales with a small number of drive circuits by effectively utilizing this time allowance.

In the image display device according to this embodiment, a pixel in the display unit has the configuration shown in FIG. 11 for handling the grayscales based on two bits, and the image display device represents the grayscales based on four bits. The image display device of this embodiment is formed to have the same configuration as that of the above-described image display device according to the first embodiment, except that the display unit and the configuration relating to this display unit are different. Therefore, the configuration of this image display device will be described based on the configuration of FIG. 9.

As shown in FIG. 33, in this embodiment, in the beginning frame of consecutive three frames, the horizontal drivers 12O and 12E output the following two bits of four-bit image data to the signal line SIG as a bit serial: the least significant bit B0 and a bit B2 upper than the least significant bit B0 by two bits.

Figures 33A, 33B, 33C, 33D, 33E, 33F, 33G:
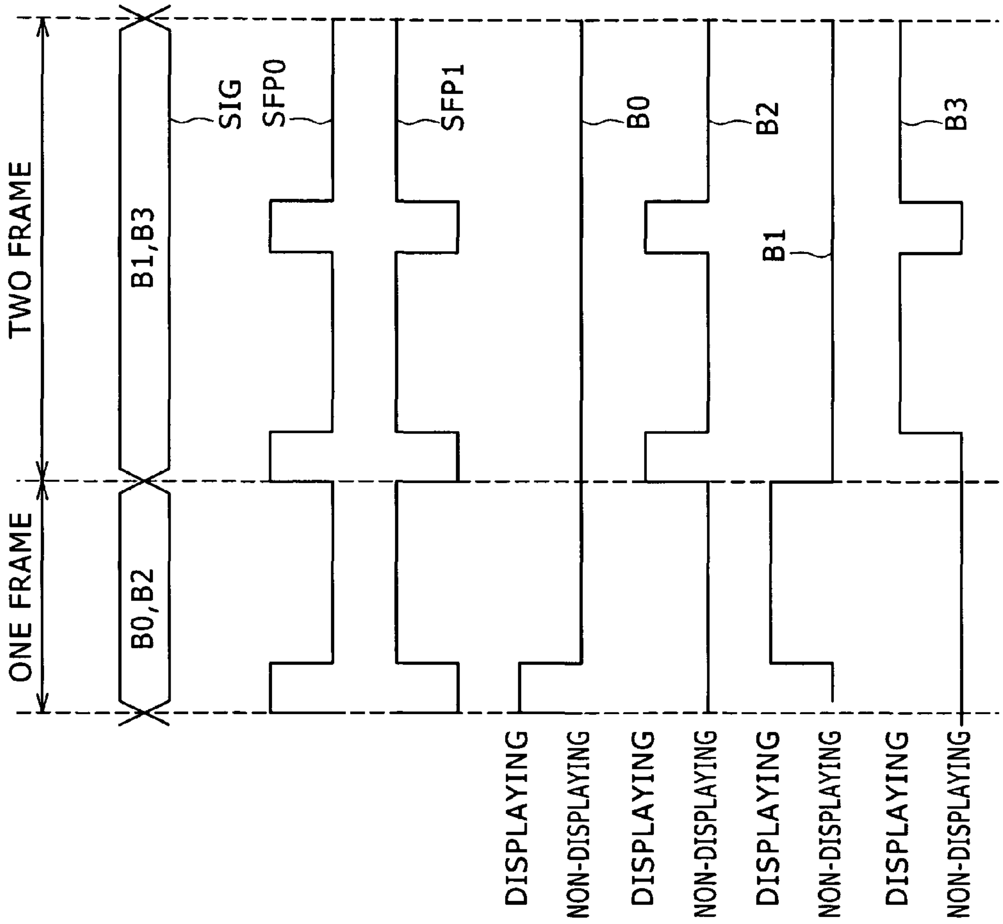
FIG. 33 is a time chart for explaining the configuration of an image display device according to a tenth embodiment of the present invention.

In the subsequent two frames, the horizontal drivers 12O and 12E output the remaining bits B1 and B3 to the signal line SIG as a bit serial (FIG. 33(A)).

The timing generator 71 outputs the selection signals SEP0 and SEP1 in such a manner as to divide the period of this beginning frame into periods having lengths in a ratio of 1:4 and divide the period of the subsequent two frames into periods having lengths in a ratio of 1:4 similarly (FIGS. 33(B) and (C)). In this embodiment, by repeating the selection signals output in the beginning frame, the period of the subsequent two frames is divided into the periods in the ratio of 1:4.

The display unit 52 acquires the bits B0 and B2 of the input image data output to the signal line SIG in the beginning frame in the drive circuits 58A and 58B, respectively, and uses the acquired data for the driving of the switch circuits 56 and 57. Furthermore, in the period of the subsequent two frames, the display unit 52 acquires the bits B1 and B3 of the input image data output to the signal line SIG in the drive circuits 58A and 58B, respectively, and uses the acquired data for the driving of the switch circuits 56 and 57.

Thus, in this embodiment, by repeating this time-division driving in the consecutive three frames, the periods used for displaying corresponding to the bits B0 to B3, respectively, are designed to have lengths in a relationship of a ratio of 1:2:4:8, to thereby display a desired image.

By carrying out the time-division driving in accordance with input image data based on repetition of driving in plural frames like this embodiment, the entire configuration can be further simplified.

(13) Eleventh Embodiment

Figure 34:
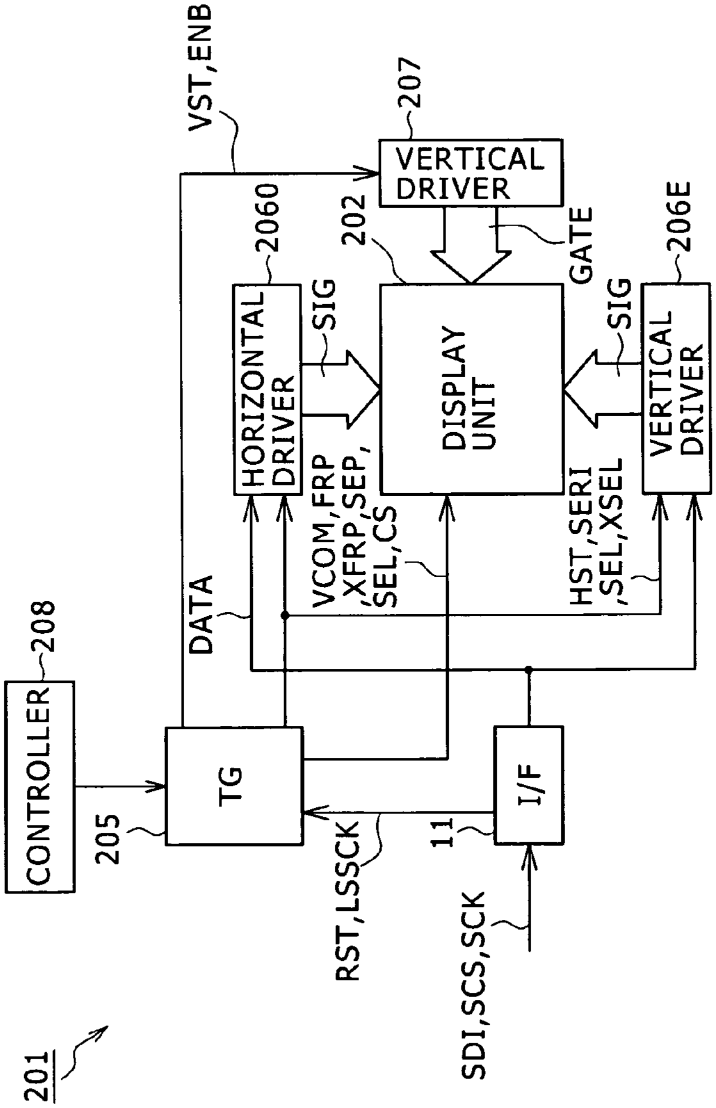
FIG. 34 is a block diagram showing an image display device according to an eleventh embodiment of the present invention.

FIG. 34 is a block diagram for showing, based on comparison with FIG. 9, an image display device according to an eleventh embodiment of the present invention. This image display device 201 is applied to portable apparatus that operates based on a battery, such as a cellular phone. This image display device 201 displays an image on a display unit 202 by driving based on an analog signal when a high grayscale is required. In contrast, in the case in which a high grayscale is unnecessary, such as the case of text displaying for an e-mail, and in the case of displaying that always involves power consumption, such as displaying of a standby screen, the image display device 201 displays an image on the display unit 202 by a multi-bit memory system in which the number of bits is small. For this purpose, in this image display device 201, the display unit 202 and so on are so configured as to match with the switching of the drive system. For this embodiment, the same components as those in the above-described embodiments are given the same symbols or numerals, and overlapping description thereof is omitted.

Figure 35:
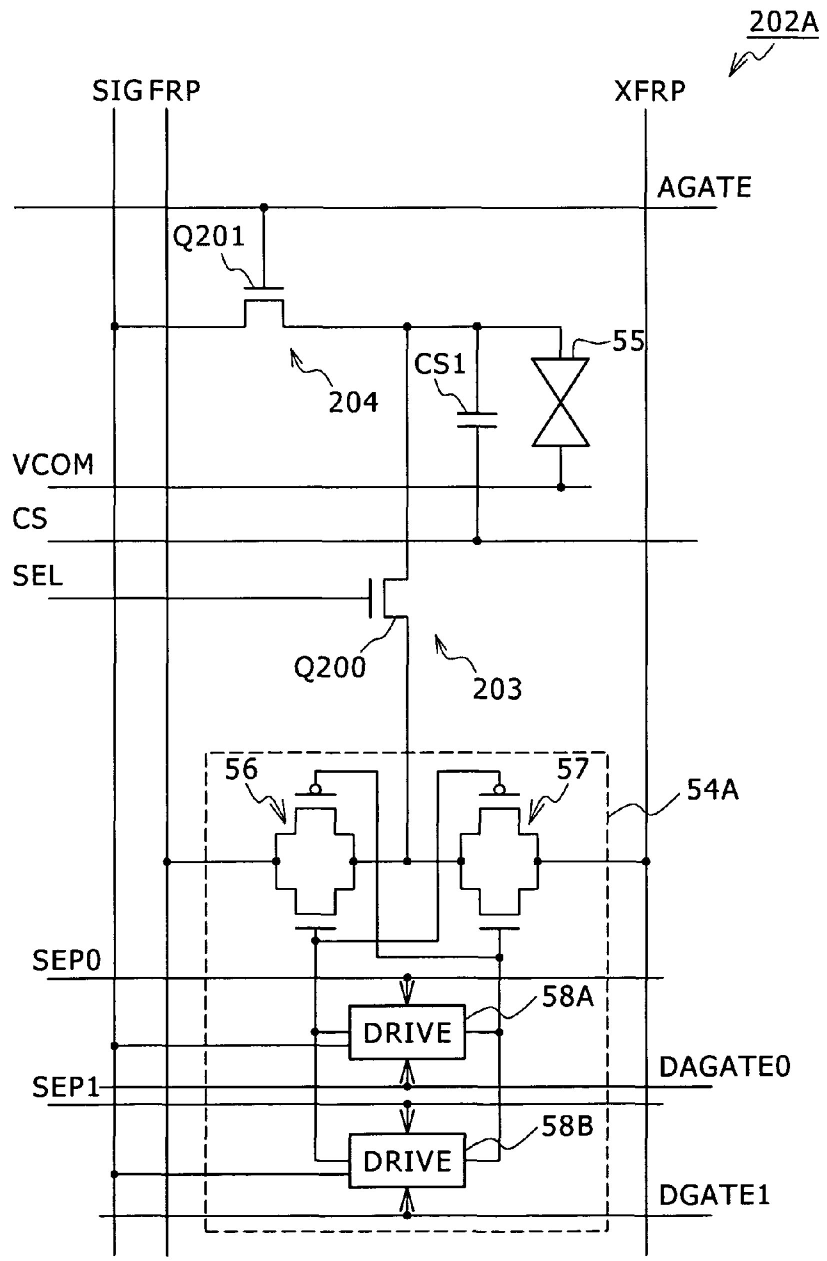
FIG. 35 is a connection diagram showing the configuration of a pixel in the image display device of FIG. 34.

FIG. 35 is a connection diagram showing one pixel in this display unit 202. This pixel 202A is provided with a configuration used for the driving based on an analog signal, in addition to the configuration of the multi-bit memory system based on two bits, described above with FIG. 11. Specifically, in this pixel 202A, the output of the switch circuits 56 and 57 of the pixel circuit 54A for two bits is output to the liquid crystal cell 55 via a switch circuit 203 for switching to digital driving, formed of an NMOS transistor Q200.

This liquid crystal cell 55 is provided with a holding capacitor CS1, and is connected to the signal line SIG via a switch circuit 204 formed of an NMOS transistor Q201 that is switched ON/OFF by a gate signal AGATE for switching to analog driving. Based on this configuration, in this pixel 202A, the switch circuit 204 for switching to analog driving and the switch circuit 203 for switching to digital driving are set to the OFF-state and the ON-state, respectively, to thereby drive the liquid crystal cell 55 by time-division driving based on the multi-bit memory system. In contrast, the switch circuit 204 for switching to analog driving and the switch circuit 203 for switching to digital driving are set to the ON-state and the OFF-state, respectively, to thereby drive the liquid crystal cell 55 for the grayscale corresponding to the signal level of the drive signal output to the signal line SIG.

Figure 36:
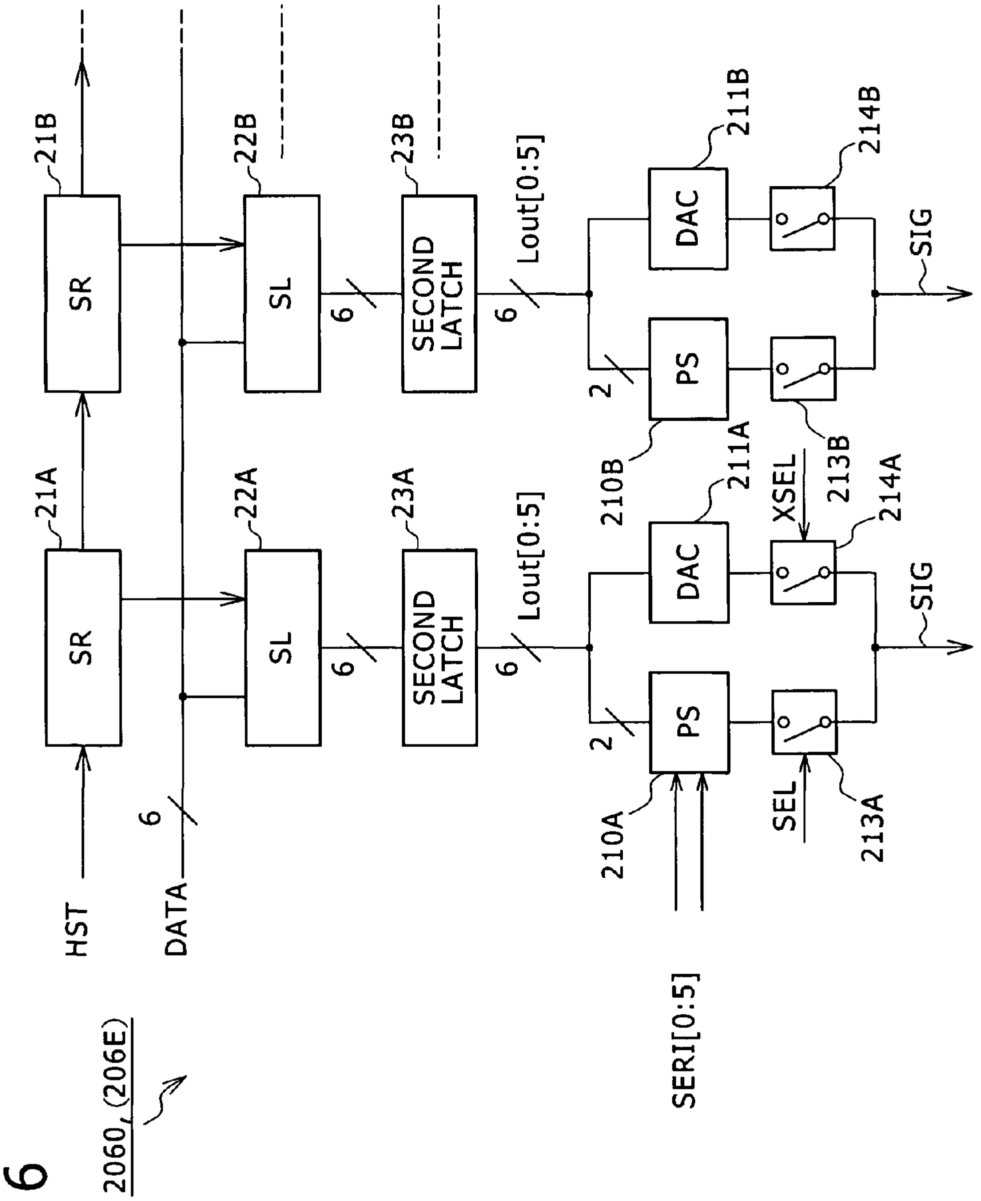
FIG. 36 is a block diagram showing the configuration of a horizontal driver in the image display device of FIG. 34.

Horizontal drivers 206O and 206E selectively output a drive signal relating to the analog-signal driving and input image data to the signal lines SIG on the odd-numbered lines and even-numbered lines, respectively, in the display unit 202. Specifically, as shown in FIG. 36, in the horizontal drivers 206O and 206E, a timing signal HST that rises up at the timing of the start of a horizontal scanning period is transferred by shift registers (SR) 21A, 21B, . . . sequentially in the line direction, and image data DATA is latched by sampling latches (SL) 22A, 22B, . . . in accordance with the timing signal output from the respective shift registers 21A, 21B, . . . . By this operation, the image data DATA is distributed toward the corresponding signal line SIG.

Furthermore, the latch results by these sampling latches 22A, 22B, . . . are latched by second latches 23A, 23B, . . . and output, to thereby match the timings of the image data distributed toward the respective signal lines SIG with each other. Parallel-serial conversion circuits (PS) 210A, 210B, . . . selectively acquire the lower-side two bits of six-bit image data output from the second latches 23A, 23B, . . . in accordance with timing signals SERI output from a timing generator 205, and convert the acquired data into serial data.

In addition, the horizontal drivers 206O and 206E subject the six-bit image data output from the second latches 23A, 23B, . . . to digital-analog conversion processing by digital-analog conversion circuits (DAC) 211A, 211B, . . . , to thereby output a drive signal relating to the analog-signal driving.

The horizontal drivers 206O and 206E selectively output the data from the parallel-serial conversion circuits 210A, 210B, . . . and the drive signal relating to the analog-signal driving output by the digital-analog conversion circuits 211A, 211B, . . . to the signal lines SIG via switch circuits 213A and 214A, 213B and 214B, . . . that are switched ON/OFF in a complementary manner by selection signals SEL and XSEL output from the timing generator 205.

Figure 37:
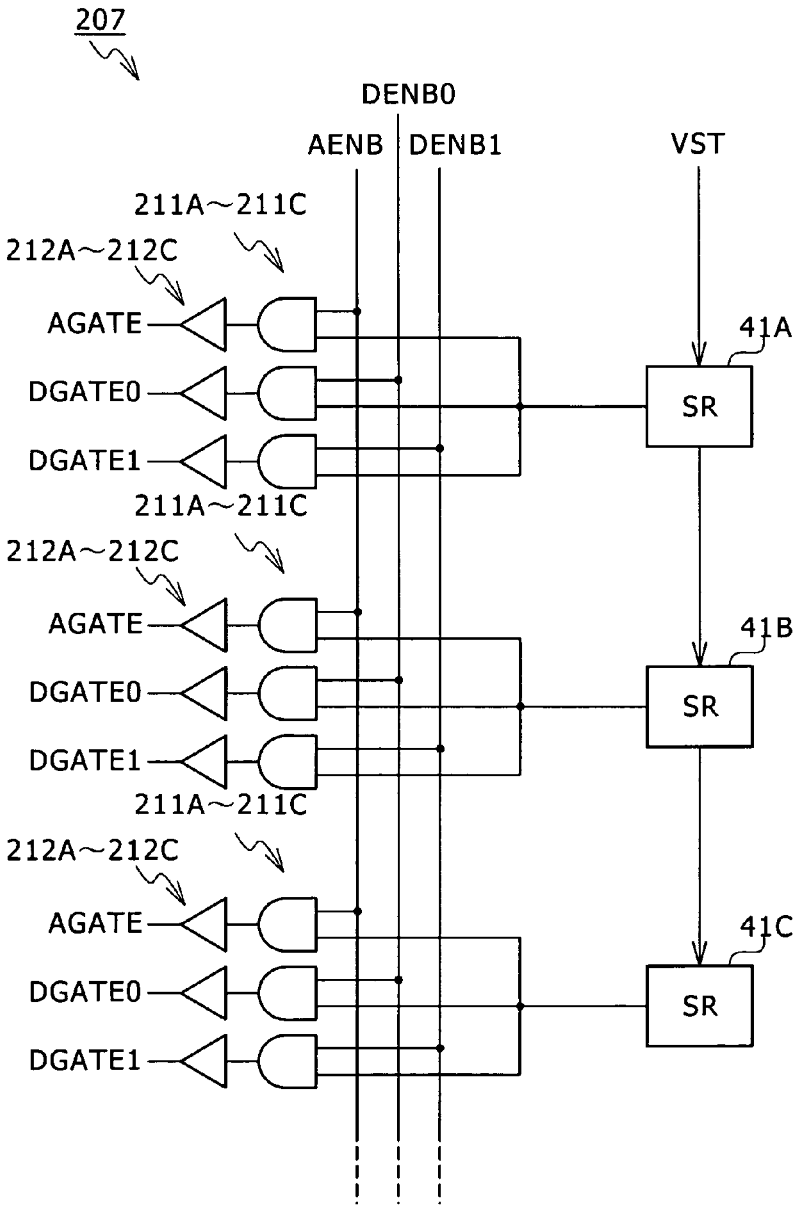
FIG. 37 is a block diagram showing the configuration of a vertical driver in the image display device of FIG. 34.

As shown in FIG. 37, in a vertical driver 207, a timing signal VST whose signal level rises up in synchronization with the vertical synchronizing signal is transferred by shift registers (SR) 41A, 41B, . . . in the vertical direction. In the vertical driver 207, selection signals AENB, DENB0, and DENB1 output from the timing generator 205 are gated by AND circuits 211A to 21C, respectively, based on the output signal from the shift registers 41A, 41B, . . . . The selection signal AENB is a signal for the analog-signal driving, and the selection signals DENB0 and DENB1 are signals for giving an instruction to write the lower bit and the upper bit, respectively, in the driving based on the multi-bit memory system. Due to this operation, a gate signal AGATE for the analog-signal driving and gate signals DGATE0 and DGATE1 for selection of the respective bits in the driving based on the multi-bit memory system are produced, so that the gate signals AGATE, DGATE0, and DGATE1 are output to the display unit 202 via buffer circuits 212A to 212C, respectively.

Figures 38A, 38B, 38C, 38D, 38E, 38F, 38G, 38H, 38I, 38J, 38L:
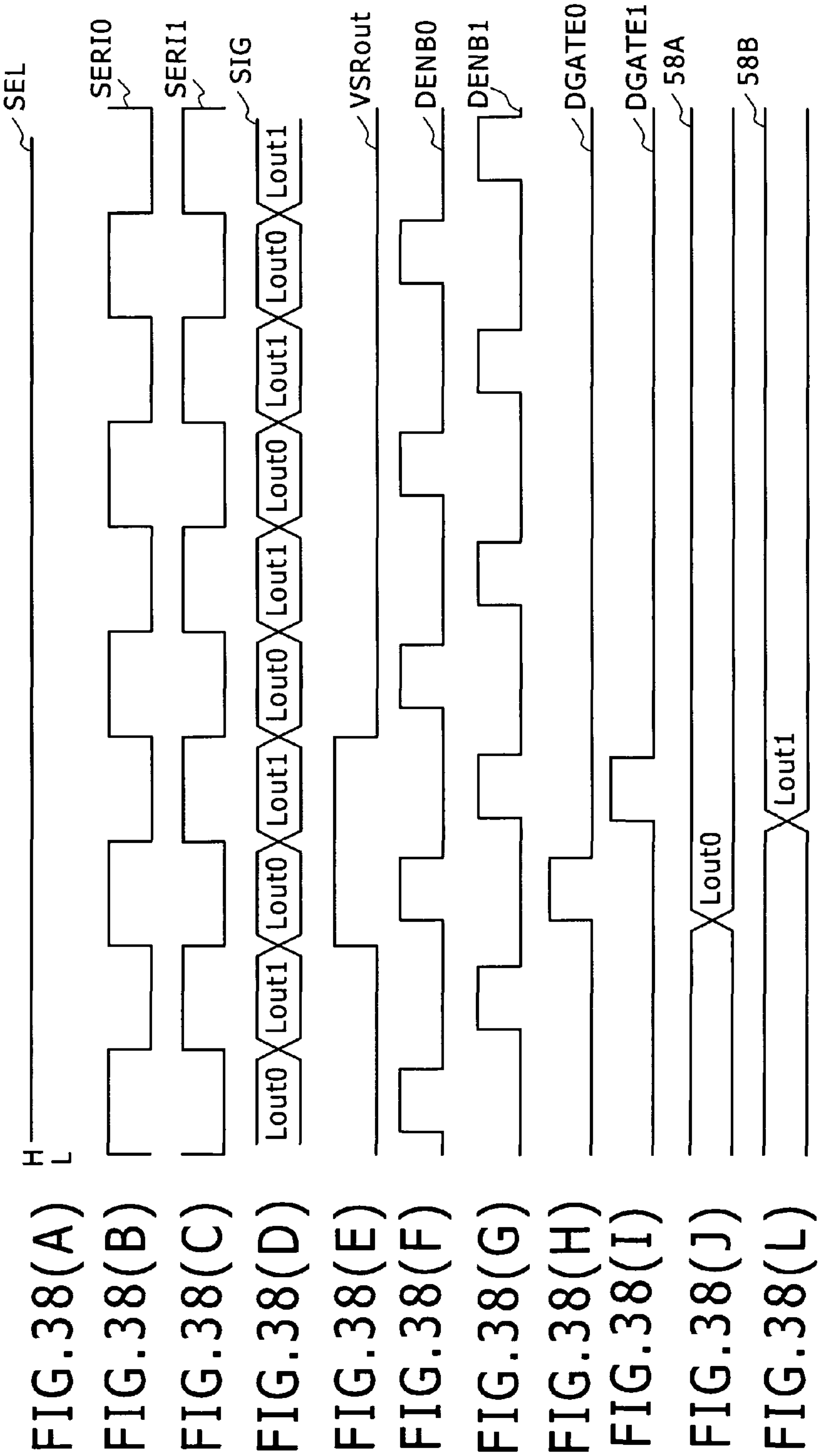
FIG. 38 is a time chart for explaining operation based on a multi-bit memory system in the image display device of FIG. 34.

Based on the above-described configuration, in this image display device 201, as shown in FIG. 38, in the state in which the level of the selection signal SEL (FIG. 38(A)) is set to the H-level, two bits Lout0 and Lout1 of the image data latched by the second latches 23A, 23B, . . . are alternately output to the signal line SIG (FIG. 38(D)) in synchronization with the timing signals SERI0 and SERI1 (FIGS. 38(B) and (C)). In the vertical driver 207, the selection signals DENB0 and DENB1 (FIGS. 38(F) and (G)) for giving an instruction to write the lower bit and the upper bit, respectively, are gated based on the timing signal VST (FIG. 38(E)) output from the shift register 41A, so that the gate signals DGATE0 and DGATE1 (FIGS. 38(H) and (L)) are output from the vertical driver 207. In accordance with the gate signals DGATE0 and DGATE1, the respective bits of the image data output to the signal line SIG are recorded in the drive circuits 58A and 58B, respectively, so that the liquid crystal cell 55 is driven based on this recording.

Figures 39A, 39B, 39C, 39D, 39E:
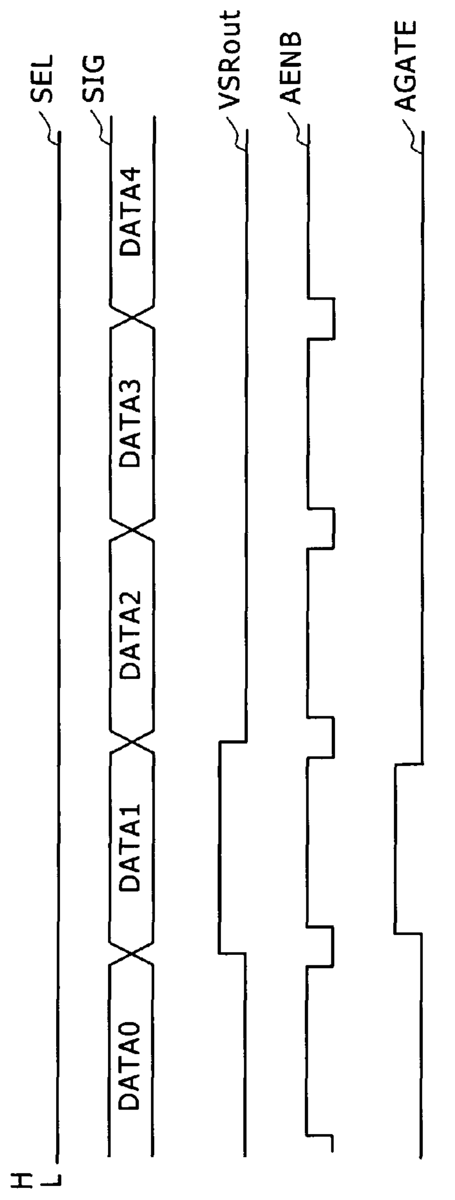
FIG. 39 is a time chart for explaining operation at the time of analog-signal driving in the image display device of FIG. 34.

On the other hand, as shown in FIG. 39, in the state in which the level of the selection signal SEL (FIG. 39(A)) is set to the L-level, the drive signal by the digital-analog conversion circuits 211A, 211B, . . . is output to the signal line SIG (FIG. 39(B)). Furthermore, the selection signal AENB (FIG. 39(D)) for selecting the analog-signal driving is gated by the timing signal VST (FIG. 39(C)) output from the shift register 41A, so that the gate signal AGATE (FIG. 39(E)) is output. In accordance with the gate signal AGATE, the liquid crystal cell 55 is driven by the drive signal output to the signal line SIG.

Figures 40A, 40B, 40C, 40D, 40E, 40F, 40G, 40H, 40I, 40J, 40L, 40M:
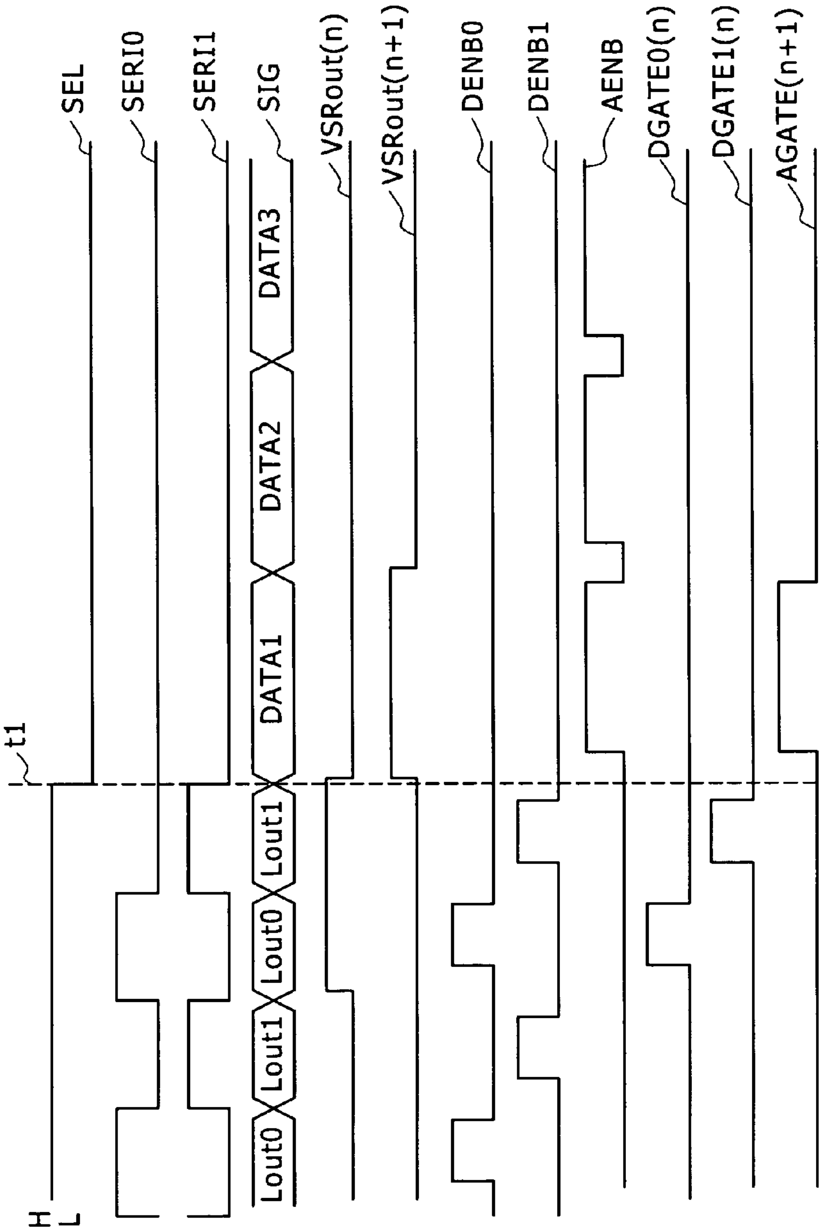
FIG. 40 is a time chart for explaining operation switching in the image display device of FIG. 34.

FIG. 40 is a time chart showing, based on comparison with FIGS. 38 and 39, the case in which the driving is switched at timing t1 from the driving based on the multi-bit memory system to the analog-signal driving.

For the above-described configuration, the timing generator 205 produces various kinds of timing signals necessary for the operation of the horizontal drivers 206O and 206E, the vertical driver 207, and the display unit 202, and outputs the signals to the respective units, under control by the controller 208.

The controller 208 is control means that controls the entire operation by executing a program recorded in a memory not shown in response to operation by a user. Upon issuing of an instruction to acquire an imaging result by a user, the controller 208 controls the operation of an imaging unit not shown to thereby acquire an imaging result. The controller 208 inputs to an interface 11 the video data SDI of a moving image and still image based on this imaging result, and controls the operation of the timing generator 205 so that it may operate for the analog-signal driving. Furthermore, the controller 208 records and holds this imaging result in the memory not shown. Upon issuing of an instruction to display the recorded and held imaging result by a user, the controller 208 displays this imaging result on the display unit 202 in a similar manner. Based on this configuration, when displaying with a high grayscale is required, the controller 208 controls the entire operation in such a way that an image will be displayed on the display unit 202 by the analog-signal driving.

In contrast, for displaying of a standby screen and e-mail, the controller 208 switches the operation of the timing generator 205 so that the displaying may be carried out by the multi-bit memory system, to thereby reduce the power consumption.

According to this embodiment, by separately providing the configuration for the analog-signal driving and switching displaying, image displaying with high image quality is carried out while the power consumption is reduced. The same advantageous effects as those by the first embodiment can be achieved.

(14) Twelfth Embodiment

Figure 41:
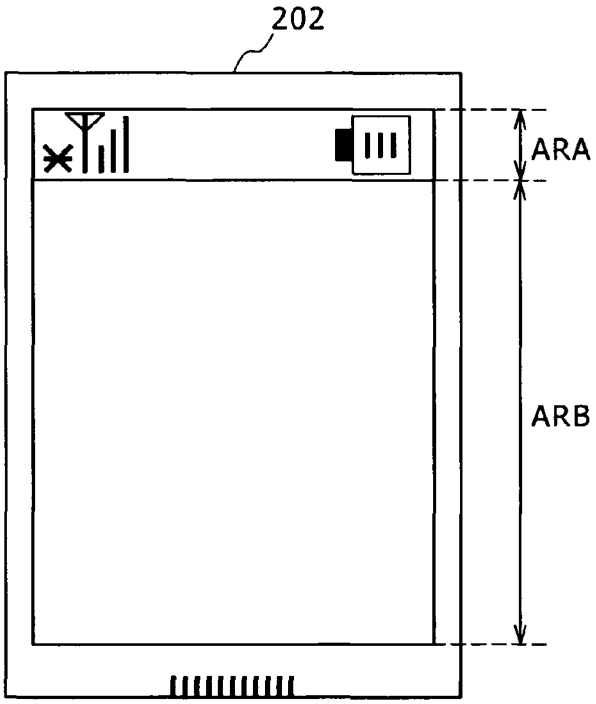
FIG. 41 is a plan view showing the display screen of an image display device according to a twelfth embodiment of the present invention.

FIG. 41 is a plan view showing the display screen of an image display device according to a twelfth embodiment of the present invention. The image display device according to this embodiment is applied to a cellular phone. In this embodiment, in the configuration of the image display device 201 described about the eleventh embodiment, through control of the timing generator 205 by the controller 208, the display screen is divided into two areas ARA and ARB arranged along the vertical direction, and the area ARA on the upper side of the screen is defined as a partial display area.

The partial display area is a display area for information that is required to always notify the status of this apparatus. For example, information on the remaining battery power, electric-field intensity, and so on is displayed on this area.

In this embodiment, the operation of the timing generator 205 is so designed by the controller 208 that displaying on this partial display area ARA will be carried out by the above-described multi-bit memory system. Furthermore, only when there is a need to update the information that is being displayed, the controller 208 updates the image data recorded in the drive circuits relating to this multi-bit memory system, to thereby correspondingly reduce the power consumption.

In contrast, on the other area ARB, image displaying is carried out by analog-signal driving.

According to this embodiment, the power consumption is reduced by carrying out image displaying based on the multi-bit memory system on a partial area of the display screen and image displaying based on the analog-signal displaying on the remaining area. Thus, the same advantageous effects as those by the eleventh embodiment can be achieved. In this case, in matching with the switching of the display system on an area-by-area basis, the display unit may have configurations that are each used exclusively for a respective one of the areas.

(15) Other Embodiments

In the above-described embodiments, input image data based on two bits or six bits is displayed by a multi-bit memory system. However, the present invention is not limited thereto but can be widely applied also to displaying of image data based on various numbers of bits.

Furthermore, in the above-described embodiments, each drive circuit is provided with a memory having an SRAM configuration. However, the present invention is not limited thereto but can widely employ various configurations such as a DRAM memory.

In addition, in the above-described embodiments, input image data based on red, green and blue color data that are each composed of six bits is input for image displaying. However, the present invention is not limited thereto but can be widely applied also to displaying of a color image based on four or more kinds of color data, and so forth.

In the above-described embodiments, the present invention is applied to a liquid crystal display obtained by fabricating a display unit and so on over a glass substrate. However, the present invention is not limited thereto but can be widely applied to various displays such as an EL (Electro Luminescence) display.

INDUSTRIAL APPLICABILITY

The present invention can be applied to e.g. a liquid crystal display based on a multi-bit memory system.

The invention claimed is:

1. An image display device comprising:

a display unit including pixels arranged in a matrix, a vertical driver that outputs a gate signal to the display unit, a horizontal driver that outputs multi-bit image data to signal lines of the display unit, wherein each pixel is comprised of:

a memory part that holds the multi-bit image data;

a plurality of sub-pixels fewer than a total number of bits for defining the multi-bit image data, and wherein area sizes of at least two of the plurality of sub-pixels are different and the pixel represents a grayscale corresponding to the input image data held in the memory part by time-division driving of said plurality of sub-pixels in accordance with each logic value corresponding to one of the bits of the input image held in the memory part, and further wherein each sub-pixel includes a memory element and drive circuit and a duration of a selection signal supplied to each drive circuit of a sub-pixel corresponds to the respective bits of the input image data of the sub-pixel.

2. The image display device according to claim 1, wherein the memory part is comprised of:

a multi-bit memory unit holding respective logical values of the input image data;

and a memory output switch circuit that selectively outputs each logic value corresponding to a position of the input image data and wherein the pixel is further comprised of a switch circuit that switches a signal applied to an electrode of the pixel in accordance with an output signal of the memory output switch circuit.

3. The image display device according to claim 1, wherein the horizontal driver outputs the input image data as serial data to a corresponding signal line, the vertical driver outputs a plurality of gate signals whose signal levels sequentially rise up in synchronization with the serial data, and the pixel sequentially acquires logical values of bits of the serial data and records the acquired logical values in the memory part in accordance with the plurality of gate signals.

4. The image display device according to claim 2, wherein a time period corresponding to a position for each logical value of the input image data is a simultaneous time period for at least two corresponding bits and the at least two bits are output to corresponding sub-pixels respectively during the simultaneous time period and area sizes for the corresponding sub-pixels are different.

5. The image display device according to claim 1, wherein a phase relating to the time-division driving in the pixel is different between adjacent lines.

6. The image display device according to claim 1, wherein the pixel includes a plurality of systems of the memory part, and the pixel switches input image data used for the time-division driving between the plurality of systems.

7. The image display device according to claim 6, wherein image displaying based on switching between the plurality of systems is image displaying based on blanking.

8. The image display device according to claim 6, wherein image displaying based on switching between the plurality of systems is image displaying based on superimposing.

9. The image display device according to claim 1, wherein the time-division driving corresponds to displaying in which a repetition cycle is a period of one frame.

10. The image display device according to claim 1, wherein the time-division driving corresponds to displaying in which a plurality of frames is allocated to driving corresponding to the respective bits of the input image data and a repetition cycle is a period of the plurality of frames.

11. The image display device according to claim 1, wherein the horizontal driver includes a digital-analog converter that executes digital-analog conversion processing for the input image data and outputs an analog signal, the horizontal driver includes a selection circuit that outputs the analog signal instead of the input image data to the signal line in accordance with a selection signal, and the pixel represents a grayscale based on driving by an analog signal output to the signal line instead of the time-division driving, in accordance with a selection signal.

12. The image display device according to claim 11, wherein the pixel includes an operation-stop switch circuit that stops the time-division driving in accordance with the selection signal, and the pixel includes an analog-signal switch circuit that selectively inputs an analog signal output to the signal line.

13. The image display device according to claim 1, wherein the horizontal driver includes a digital-analog converter that executes digital-analog conversion processing for the input image data and outputs an analog signal, the horizontal driver includes a selection circuit that outputs the analog signal instead of the input image data to the signal line in accordance with a selection signal, and the pixel in a partial area of the display unit represents a grayscale based on driving by an analog signal output to the signal line instead of the time-division driving, in accordance with a selection signal.

14. An electronic apparatus that acquires input image data by image acquiring means and displays the input image data by an image display device, comprising:

a display unit that has pixels arranged in a matrix, a vertical driver that outputs a gate signal to the display unit, a horizontal driver that outputs multi-bit image data to signal lines of the display unit, and each pixel includes a memory part that holds the multi-bit image data, and a plurality of sub-pixels fewer than a total number of bits for defining the multi-bit image data, and wherein area sizes of at least two of the plurality of sub-pixels are different and the pixel represents a grayscale corresponding to the input image data held in the memory part by time-division driving of said plurality of sub-pixels in accordance with each logic value corresponding to one of the bits of the input image held in the memory part, and further wherein each sub-pixel includes a memory element and drive circuit and a duration of a selection signal supplied to each drive circuit of a sub-pixel corresponds to the respective bits of the input image data of the sub-pixel.

15. A portable display apparatus that operates based on a battery displays the input image data by an image display device part, wherein the image display device part includes a display unit that has pixels arranged in a matrix, a vertical driver that outputs a gate signal to the display unit, a horizontal driver that outputs multi-bit image data to signal lines of the display unit, and each pixel includes a memory part that holds the multi-bit image data, and a plurality of sub-pixels fewer than a total number of bits for defining the multi-bit image data, and wherein area sizes of at least two of the plurality of sub-pixels are different and the pixel represents a grayscale corresponding to the input image data held in the memory part by time-division driving of said plurality of sub-pixels in accordance with each logic value corresponding to one of the bits of the input image held in the memory part, and further wherein each sub-pixel includes a memory element and drive circuit and a duration of a selection signal supplied to each drive circuit of a sub-pixel corresponds to the respective bits of the input image data of the sub-pixel.

16. An image displaying method for driving a plurality of pixels arranged in a matrix based to thereby display an image corresponding to input image data, the method comprising:

applying multi-bit image data to the plurality of pixels, each of the pixels including a plurality of sub-pixels fewer than a total number of bits for defusing the multi-bit image data, and wherein area sizes of at least two of the plurality of sub-pixels are different and the pixel represents a grayscale corresponding to the input image data held in a memory part by time-division driving of said plurality of sub-pixels in accordance with each logic value corresponding to one of the bits of the input image held in the memory part, and further wherein each sub-pixel includes a memory element and drive circuit and a duration of a selection signal supplied to each drive circuit of a sub-pixel corresponds to the respective bits of the input image data of the sub-pixel.

* * * * *